(12) United States Patent
Gottlob et al.

(10) Patent No.: US 7,162,485 B2
(45) Date of Patent: Jan. 9, 2007

(54) EFFICIENT PROCESSING OF XPATH QUERIES

(76) Inventors: Georg Gottlob, Pressgasse 21/6 A-1040, Wien (AT); Christoph Koch, Beatrixgasse 26/70 A-1030, Wien (AT); Reinhard Pichler, Karlgasse 4-6/2 A-3002, Purkersdorf (AT)

( * ) Notice: Subject to any disclaimer, the term of this patent is extended or adjusted under 35 U.S.C. 154(b) by 309 days.

(21) Appl. No.: 10/463,327

(22) Filed: Jun. 18, 2003

(65) Prior Publication Data

US 2004/0060007 A1    Mar. 25, 2004

Related U.S. Application Data

(60) Provisional application No. 60/389,513, filed on Jun. 19, 2003.

(51) Int. Cl.
*G06F 17/30* (2006.01)
(52) U.S. Cl. .................................... 707/102
(58) Field of Classification Search ............ 707/1–10, 707/100–104.1, 200–206; 715/513
See application file for complete search history.

(56) References Cited

U.S. PATENT DOCUMENTS

2003/0074352 A1\* 4/2003 Raboczi et al. ............... 707/4
2004/0073541 A1\* 4/2004 Lindblad et al. .............. 707/3
2004/0167864 A1\* 8/2004 Wang et al. ................... 707/1

OTHER PUBLICATIONS

Georg Gottlob et al, "XPath processing in a nutshell", 2003, ACM Press, NY, NY, vol. 32, Issue 1, pp. 12-19.\*
Georg Gottlob et al., "The complexity of XPath query evaluation", 2003, ACM Press, NY, NY., pp. 179-190.\*

\* cited by examiner

*Primary Examiner*—Diane D. Mizrahi
(74) *Attorney, Agent, or Firm*—Sughrue Mion, PLLC

(57) ABSTRACT

The disclosed teachings provide methods and systems for efficient evaluation of XPath queries. In particular, the disclosed evaluation methods require only polynomial time with respect to the total size of an input XPath query and an input XML document. Crucial for the new methods is the notion of "context-value tables". This idea can be further refined for queries in Core XPath and XSLT Patterns so as to yield even a linear time evaluation method. Moreover, the disclosed methods can be used for improving existing methods and systems for processing XPath expressions so to guarantee polynomial worst-case complexity.

77 Claims, 5 Drawing Sheets

Parse tree of the XPath Query in Example 8.

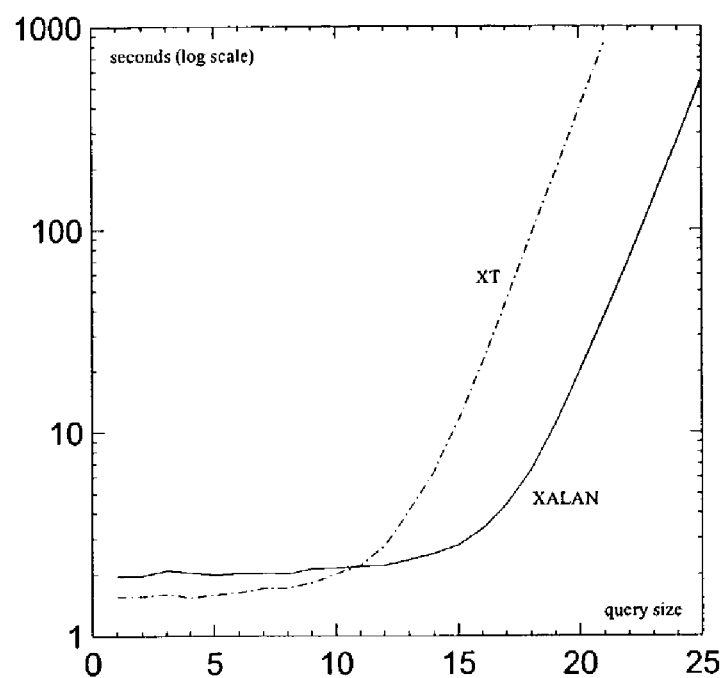
Figure 1: Exponential-time query complexity of XT and XALAN.

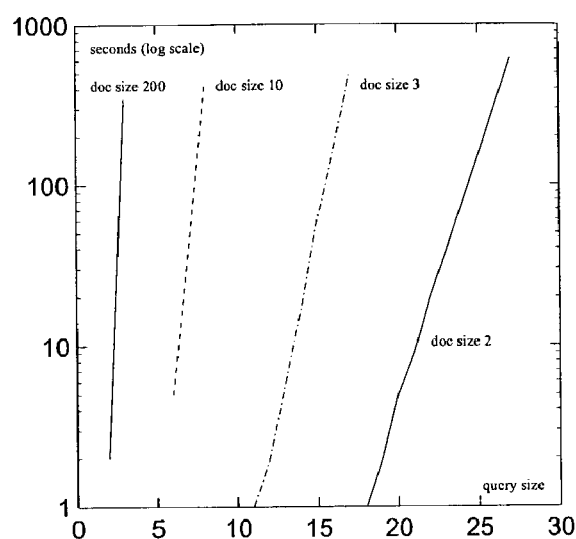
Figure 2: Exponential-time query complexity of IE6, for document sizes 2, 3, 10, and 200.

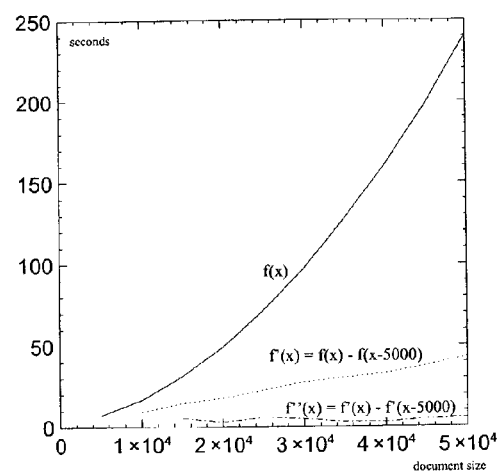
Figure 3: Quadratic-time data complexity of IE6. $f'$ and $f''$ are the first and second derivatives, respectively, of our graph of timings $f$.

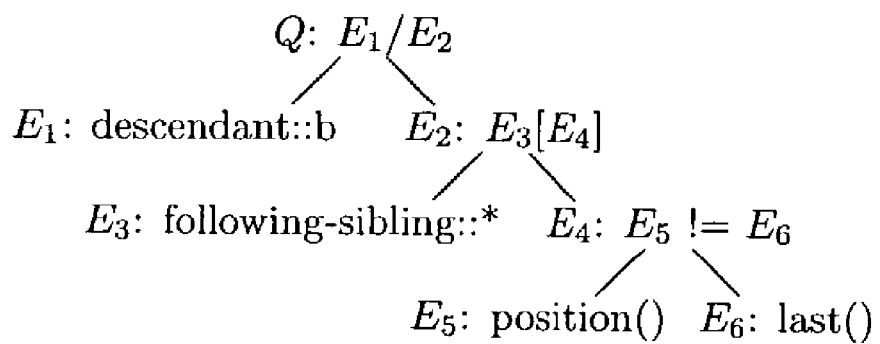
Figure 4: Parse tree of the XPath Query in Example 8.

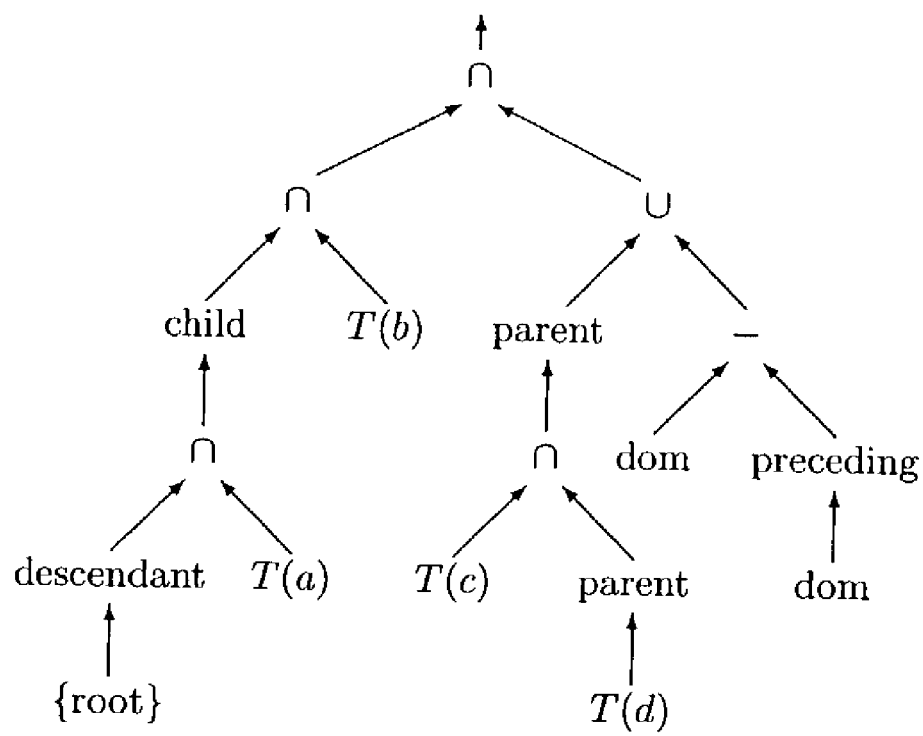
Figure 5: Query tree of the XPath Query in Example 15.

EFFICIENT PROCESSING OF XPATH QUERIES

A RELATED APPLICATIONS

This application claims benefit of Provisional Application No. 60/389,513 filed Jun. 19, 2002; the disclosure of which is incorporated herein by reference.

B BACKGROUND

B.1 Field of Invention

This disclosure teaches techniques, methods and systems related in general to the field of information processing. More particularly, the teachings relate to methods, systems, and computer-program products for querying tree-structured databases, Web pages, or XML documents using formalisms or query languages that share certain characteristics and navigational constructs such as path expressions with the standardized XPath 1 formalism [W4] of the World Wide Web Consortium.

B.2 Basic Concepts, Terminology, and Introduction

The reader is assumed to be familiar with XML (cf. [W2]), XPath and, in particular, with standard notions such as axes and location steps in XPath (cf. [W4]). XPath has been proposed by the W3C [W4] primarily as a practical language for selecting nodes from XML document trees. But it is also designed to be used for formulating expressions that evaluate to a string, a number or a boolean value. The importance of XPath stems from 1. its potential application as an XML query language per se and
2. it being at the core of several other XML-related technologies, such as XSLT, XPointer, and XQuery, and the great and well-deserved interest such technologies receive.

B.3 Desirable Properties of Methods and Systems Evaluating Xpath Queries and Xpath Expressions over XML Documents Since XPath and related technologies will be tested in ever-growing deployment scenarios, its implementations need to scale well both with respect to the size of the XML data and the growing size and intricacy of the queries (usually referred to as combined complexity). In particular, this evaluation should profitably be feasible in polynomial time for any given XML document, any given XPath query or XPath expression and, optionally, any given context.

B.4 References

The following documents provide background information helpful in understanding this disclosure, and to that extent, they are incorporated herein by reference. They are referred to, using the abbreviated notations shown below, in subsequent discussions to indicate specific relevance wherever necessary.

REFERENCES

[H1] Internet Explorer IE6. http://www.microsoft.com/windows/ie/default.asp.

[H2] Saxon version 6.5.2. http://saxon.sourceforge.net/.

[H3] Xalan-Java version 2.2.D11. http://xml.apache.org/xalan-j/.

[H4] XT. A fast, free implementation of XSLT in Java. http://www.blnz.com/xt/index. html (formerly http://www.jclark.com/xml/xt.html/).

[S1] G. J. Bex, S. Maneth, and F. Neven. A Formal Model for an Expressive Fragment of XSLT. In *Proceedings of the 1st International Conference on Computational Logic (CL 2000)*, LNCS 1861, pages 1137–1151. Springer, 2000.

[S2] G. Gottlob, C. Koch, and R. Pichler. "Efficient Algorithms for Processing XPath Queries". In *Proceedings of the 28th International Conference on Very Large Data Bases (VLDB '02)*, pages 95–106, Hong Kong, China, August 2002.

[S3] G. Gottlob, C. Koch, and R. Pichler. "XPath Query Evaluation: Improving Time and Space Efficiency". In *Proceedings of the 19th IEEE International Conference on Data Engineering (ICDE '03)*, pages 379–390, Bangalore, India, March 2003.

[S4] D. Shasha, J. T. L. Wang, and R. Giugno. "Algorithmics and Applications of Tree and Graph Searching". In *Proceedings of the 21st ACM SIGACT-SIGMOD-SIGART Symposium on Principles of Database Systems (PODS '02)*, pages 39–52, Madison, Wis., June 2002.

[S5] P. Wadler. "A Formal Semantics of Patterns in XSLT". In *Markup Technologies,* Philadelphia, December 1999. Revised version in Markup Languages, MIT Press, June 2001.

[S6] P. Wadler. "Two Semantics for XPath", 2000. Draft paper available at http://www.research.avayalabs.com/user/wadler/.

[W1] World Wide Web Consortium. DOM Specification. http://www.w3c.org/DOM/.

[W2] World Wide Web Consortium. "Extensible Markup Language (XML) 1.0 (Second Edition)", October 2000. http://www.w3.org/TR/REC-xml.

[W3] World Wide Web Consortium. XSL Working Draft. http://www.w3.org/TR/1998/WD-xsl-19981216.

[W4] World Wide Web Consortium. XML Path Language (XPath) Recommendation. http://www.w3c.org/TR/xpath/, November 1999.

B.5 Description and Critique of Related Art

In this section, we evaluate the efficiency of three XPath engines, namely Apache XALAN (the Lotus/IBM XPath implementation which has been donated to the Apache foundation) and James Clark's XT, which are, as we believe, the two most popular freely available XPath engines, and Microsoft Internet Explorer 6 (IE6), a commercial product. We have not made explicit experiments with Saxon, which is another popular XSLT processor (thus including an XPath engine), see [H2]. At any rate, also Saxon, in general, exhibits the exponential behavior that we observed for the other three systems mentioned above.

The version of XALAN used for the experiments was Xalan-j_2_2_D11 (i.e., a Java release). We used the current version of XT (another Java implementation) with release tag 19991105, as available on James Clark's home page, in combination with his XP parser through the SAX driver. We ran both XALAN and XT on a 360 MHz (dual processor) Ultra Sparc 60 with 512 MB of RAM running Solaris. IE6 was evaluated on a Windows 2000 machine with a 1.2 GHz AMD K7 processor and 1.5 GB of RAM.

XT and IE6 are not literally XPath engines, but are able to process XPath embedded in XSLT transformations. We used the xsl:for-each performative to obtain the set of all nodes an XPath query would evaluate to.

We show by experiments that all three implementations require time exponential in the size of the queries in the worst case. Furthermore, we show that even the simplest queries, with which IE6 can deal efficiently in the size of the queries, take quadratic time in the size of the data. Since we used two different platforms for running the benchmarks, our goal of course was not to compare the systems against each other, but to test the scalabilities of their XPath processing methods. The reason we used two different platforms was that Solaris allows for accurate timing, while IE6 is only available on Windows. (The IE6 timings reported on here have the precision of ±1 second).

For our experiments, we generated simple, flat XML documents. Each document DOC(i) was of the form $$\langle a\rangle\underbrace{\langle b/\rangle \ldots \langle b/\rangle}_{i \text{ times}}\langle/a\rangle$$

and its tree thus contained i+1 element nodes.

Experiment 1: Exponential-time Query Complexity of XALAN and XT

In this experiment, we used the fixed document DOC(2) (i.e., $\langle a\rangle\langle b/\rangle\langle b/\rangle\langle/a\rangle$). Queries were constructed using a simple pattern. The first query was '//a/b' and the i+1-th query was obtained by taking the i-th query and appending '/parent::a/b'. For instance, the third query was '//a/b/parent::a/b/parent::a/b'.

It is easy to see that the time measurements reported in FIG. 1, which uses a log scale Y axis, grow exponentially with the size of the query. The sharp bend in the curves is due to the near-constant runtime overhead of the Java VM and of parsing the XML document.

Discussion

This behavior can be explained with the following pseudocode fragment, which seems to appropriately describe the basic query evaluation strategy of XALAN and XT.

```
procedure process-location-step(n₀, Q)
/* n₀ is the context node; query Q is a list of location steps */
begin
    node set S := apply Q.first to node n₀;
    if (Q.tail is not empty) then
        for each node n ∈ S do process-location-step(n, Q.tail);
end
```

It is clear that each application of a location step to a context node may result in a set of nodes of size linear in the size of the document (e.g., each node may have a linear number of descendants or nodes appearing after it in the document). If we now proceed by recursively applying the location steps of an XPath query to individual nodes as shown in the pseudocode procedure above, we end up consuming time exponential in the size of the query in the worst case, even for very simple path queries. As a (simplified) recurrence, we basically have $$\text{Time}(|Q|) \approx \begin{cases} |D| * \text{Time}(|Q|-1) & \ldots |Q| > 0 \\ 1 & \ldots |Q| = 0 \end{cases}$$

where |Q| is the length of the query and |D| is the size of the document, or equivalently $$\text{Time}(|Q|) \approx |D|^{|Q|}.$$

The class of queries used puts an emphasis on simplicity and reproducibility (using the very simple document $\langle a\rangle\langle b/\rangle\langle b/\rangle\langle/a\rangle$). Interestingly, each 'parent::a/b' sequence quite exactly doubles the times both systems take to evaluate a query, as we first jump (back) to the tree root labeled "a" and then experience the "branching factor" of two due the two child nodes labeled "b".

Our class of queries may seem contrived; however, it is clear that we make a practical point. First, more realistic document sizes allow for very short queries only. We will show this in the second experiment for IE6, and have verified it for XALAN and XT as well. At the same time, XPath query engines need to be able to deal with increasingly sophisticated queries, along the current trend to delegate larger and larger parts of data management problems to query engines, where they can profit from their efficiency and can be made subject to optimization. The intuition that XPath can be used to match a large class of tree patterns (cf. [S4]) in XML documents also implies to a certain degree that queries may be extensive.

Moreover, similar queries using antagonist axes such as "following" and "preceding" instead of "child" and "parent" do have practical applications, such as when we want to put restrictions on the relative positions of nodes in a document. Finally, if we make the realistic assumption that the documents are always much larger than the queries ($|Q|<<|D|$), it is not even necessary to jump back and forth with antagonist axes. We can use queries such as //following::*/following::*/. . . /following::* to observe exponential behavior.

Experiment 2: Exponential-time Query Complexity of Internet Explorer 6

In our second experiment, we executed queries that nest two important features of XPath, namely paths and arithmetics, using IE6. The first three queries were //a/b[count(parent::a/b)>1]

//a/b[count(parent::a/b[count(parent::a/b)>1])>1]

//a/b[count(parent::a/b[count(parent::a/b[count(parent::a/b)>1])>1])>1] *and* it is clear how to continue this *sequence*.

The experiment was carried out for four document sizes (2, 3, 10, and 200). FIG. 2 shows clearly that IE6 requires time exponential in the size of the query.

Experiment 3: Quadratic-time Data Complexity for Simple Path Queries (IE6)

For our third experiment, we took a fixed query and benchmarked the time taken by IE6 for various document sizes. The query was '//a'+q(20)+'//b' with $$q(i) := \begin{cases} \text{`}//b[\text{ancestor::}a\text{'} + q(i-1) + \text{`}//b]/\text{ancestor::}a\text{'} & \ldots i > 0 \\ \text{`'} & \ldots i = 0 \end{cases}$$

(Note: The size of queries q(i) is of course O(i).)

EXAMPLE 1

For instance, the query of size two according to this scheme, i.e. '//a'+q(2)+'//b', is //a//b [ancestor::a//b [ancestor::a//b]/ancestor::a//b]/ancestor::a//b The granularity of measurements (in terms of document size) was 5000 nodes. FIG. 3 shows that IE6 takes quadratic time w.r.t. the size of the data already for this simple class of path queries.

SUMMARY

The disclosed teachings provide methods, systems and computer-program products for the efficient evaluation of XPath expressions over XML documents. Features of this evaluation are:

The evaluation of arbitrary XPath expressions works in time polynomial with respect to the combined size of the input XPath expression and the XML document.

The evaluation uses—either as an explicit data structure or implicitly—a query-tree of the input XPath expression, which can be either processed bottom-up or top-down.

The evaluation sets up for each subexpression of the input XPath expression—either as an explicit data structure or implicitly via recursive procedure calls—a socalled context-value table, which juxtaposes the possible or relevant contexts on the one hand and the corresponding result value of the XPath subexpression for this context on the other hand.

Note that these methods are not confined to a single embodiment but can be embodied in various ways. It should be clear that the detailed description given in this document is only an example implementation and should not be construed to restrict the scope of the claims in any way.

Further, computer-program products including computer-readable media with instructions that implement the systems and methods disclosed, completely or partially, are also contemplated as being within the overall scope of the disclosed teachings. It should be noted that the media could be anything including but not limited to RAMs, ROMs, hard disks, CDs, tapes, floppy disks, Internet downloads, etc. In short, any medium that can fix all or a subset of the instructions, even for a transient period of time, is considered as a computer-readable media for the purposes of this disclosed teaching. Further the type of computer that can implement is also not restricted to any particular type, but includes personal computers, workstations, mainframes and the like. Also, it can be implemented on a stand-alone computer or in a distributed fashion across a network, including but not limited to, the Internet.

BRIEF DESCRIPTION OF THE DRAWINGS

1. FIG. 1 "Exponential-time query complexity of XT and XALAN": A function graph showing the exponential behavior of the XPath engines of XT and XALAN.

2. FIG. 2 "Exponential-time query complexity of IE6, for document sizes 2, 3, 10, and 200": A function graph showing the exponential behavior of the IE6 for various inputs.

3. FIG. 3 "Quadratic-time data complexity of IE6. $f'$ and $f''$ are the first and second derivatives, respectively, of our graph of timings $f$": Function graphs showing that the IE6 requires quadratic time w.r.t. the size of the data for the evaluation of a class of XPath queries that can be evaluated in linear time by the method and system described in Part IV, Section F.1.

4. FIG. 4 "Parse tree of the XPath Query in Example 8": Parse tree of the XPath query Q=descendant::b/following-sibling::*[position( ) !=last( )].

5. FIG. 5 "Query tree of the XPath Query in Example 15.": Parse tree of the XPath query Q=/descendant::a/child::b[child::c/child::d or not (following::*)].

DETAILED DESCRIPTION OF THE INVENTION

The following description of a preferred embodiment of our invention and of some variations and ramifications thereof is made for illustrating the general principles of the invention and is not to be taken in any limiting sense.

A Basic Notions

The following assumptions and simplifications do not restrict the applicability of the invention. In fact, anybody skilled in the art can adapt our methods to all other versions of XPath (notably XPath 2), languages similar in nature to XPath, and to full XML data models.

In this document, we use an XML document model simplified as follows. An XML document is viewed as an unranked (i.e., nodes may have a variable number of children), ordered, and labeled tree. All of the artifacts of this and the next section are defined in the context of a given XML document. Given a document tree, let dom denote the set of its nodes, and let us use the two functions firstchild, nextsibling:dom→dom, to represent its structure. Actually, "firstchild" and "nextsibling" are part of the XML Document Object Model (DOM), cf. [W1]. "firstchild" returns the first child of a node (if there are any children, i.e., the node is not a leaf), and otherwise "null". Let $n_1, \ldots, n_k$ be the children of some node in document order. Then, nextsibling($n_i$)=$n_{i+1}$, i.e., "nextsibling" returns the neighboring node to the right, if it exists, and "null" otherwise (if i=k). We define the functions firstchild$^{-1}$ and nextsibling$^{-1}$ as the inverses of the former two functions, where "null" is returned if no inverse exists for a given node. Where appropriate, we will use binary relations of the same name instead of the functions, i.e., $\{(x, f(x)\langle |x \in dom, f(x) \neq null\}$ is the binary relation for function $f$.

B Efficient Utilization of Xpath Axes

The axes self, child, parent, descendant, ancestor, descendant-or-self, ancestor-or-self, following, preceding, following-sibling, and preceding-sibling are binary relations $\chi \subseteq dom \times dom$. Let self:=$\{\rangle x,x\langle |x \in dom\}$. The other axes are defined in terms of our "primitive" relations "firstchild" and "nextsibling" as shown in Table 1 (cf. [W4]). $R_1.R_2$, $R_1 \cup R_2$, and $R_1^*$denote t union, and reflexive and transitive closure, respectively, of binary relations $R_1$ and $R_2$. Let $E(\chi)$ denote the regular expression defining $\chi$ in Table 1. It is important to observe that some axes are defined in terms of other axes, but that these definitions are acyclic.

---

Definition 2 (Axis Function) Let $\chi$ denote an XPath axis relation. We define the function $\chi : 2^{dom} \to 2^{dom}$ as $\chi(X_0) = \{x \mid \exists x_0 \in X_0 : x_0 \chi x\}$ (and thus overload the relation name $\chi$), where $X_0 \subseteq$ dom is a set of nodes. □

Procedure 3 (Axis Evaluation)
Input: A set of nodes S and an axis $\chi$
Output: $\chi$(S)
Method: eval$_\chi$(S)
function eval$_{(R1 \cup \ldots \cup Rn)}$ * (S) begin
  S' := S; /* S' is represented as a list */
  while there is a next element x in S' do
    append $\{R_i(x) \mid 1 \leq i \leq n, R_i(x) \neq null, R_i(x) \in S'\}$ to S';
  return S';
end;
function eval$_\chi$(S) := eval$_{E(\chi)}$(S).
function eval$_{self}$(S) := S.
function eval$_{e1.e2}$(S) := eval$_{e2}$(eval$_{e1}$(S)).
function eval$_R$(S) := $\{R(x) \mid x \in S\}$.
function eval$_{\chi 1 \cup \chi 2}$(S) := eval$_{\chi 1}$(S) $\cup$ eval$_{\chi 2}$(S).

where $S \subseteq \text{dom}$ is a set of nodes of an XML document, $e_1$ and $e_2$ are regular expressions, $R, R_1, \ldots, R_n$ are primitive relations, $\chi_1$ and $\chi_2$ are axes, and $\chi$ is an axis other than "self".

Clearly, some axes could have been defined in a simpler way in Table 1 (e.g., ancestor equals parent.parent*). However, the definitions, which use a limited form of regular expressions only, allow to compute $\chi(S)$ in a very simple way, as evidenced by Procedure 3.

Consider the directed graph $G=(V, E)$ with $V=\text{dom}$ and $E=R_1 \cup \ldots \cup R_n$. The function $\text{eval}_{(R_1 \cup \ldots \cup R_n)}*$ essentially computes graph reachability on G (not transitive closure). It can be implemented to run in linear time in terms of the size of the data (corresponding to the edge relation E of the graph. Note that $|E| \approx 2 \cdot |T|$, where $|T|$ is the size of the edge relation of the document tree.) in a straightforward manner; (non)membership in S' is checked in constant time using a direct-access version of S' maintained in parallel to its list representation (naively, this could be an array of bits, one for each member of dom, telling which nodes are in S').

Then Procedure 3 has the following properties:

TABLE 1

Axis definitions in terms of "primitive" tree relations and their inverses.

```
child := firstchild.nextsibling*
parent := (nextsibling⁻¹)*.firstchild⁻¹
descendant := firstchild.(firstchild ∪ nextsibling)*
ancestor := (firstchild⁻¹ ∪ nextsibling⁻¹)*.firstchild⁻¹
descendant-or-self := descendant ∪ self
ancestor-or-self := ancestor ∪ self
following := ancestor-or-self.nextsibling.
        nextsibling*.descendant-or-self
preceding := ancestor-or-self.nextsibling⁻¹.
        (nextsibling⁻¹)*.descendant-or-self
following-sibling := nextsibling.nextsibling*
preceding-sibling := (nextsibling⁻¹)*.nextsibling⁻¹
```

Let $S \subseteq \text{dom}$ be a set of nodes of an XML document and $\chi$ be an axis. Then, 1. $\chi(S) = \text{eval}_\chi(S)$ and
2. Procedure 3 runs in time $O(|\text{dom}|)$.

The $O(|\text{dom}|)$ upper bound on the running time is due to the fact that each of the eval functions can be implemented so as to visit each node at most once and the number of calls to eval functions and relations joined by union is constant (see Table 1).

C Data Model

Let dom be the set of nodes in the document tree as introduced in Section A. Each node is of one of seven types, namely root, element, text, comment, attribute, namespace, and processing instruction. As in DOM [W1], the root node of the document is the only one of type "root", and is the parent of the document element node of the XML document. The main type of non-terminal node is "element", the other node types are self-explaining (cf. [W4]). Nodes of all types besides "text" and "comment" have a name associated with it.

A node test is an expression of the form $\tau()$ (where $\tau$ is a node type or the wildcard "node", matching any type) or $\tau(n)$ (where n is a node name and $\tau$ is a type whose nodes have a name). $\tau(*)$ is equivalent to $\tau()$. We define a function T which maps each node test to the subset of dom that satisfies it. For instance, $T(\text{node}()) = \text{dom}$ and $T(\text{attribute}(\text{href}))$ returns all attribute nodes labeled "href".

EXAMPLE 4

Consider DOC(4) of Part I, Section B.5. It consists of six nodes—the document element node a labeled "a", its four children $b_1, \ldots, b_4$ (labeled "b"), and a root node r which is the parent of a. We have $T(\text{root}()) = \{r\}$, $T(\text{element}()) = \{a, b_1, \ldots, b_4\}$, $T(\text{element}(a)) = \{a\}$, and $T(\text{element}(b)) = \{b_1, \ldots, b_4\}$.

Now, XPath axes differ from the abstract, untyped axes of Section B in that there are special child axes "attribute" and "namespace" which filter out all resulting nodes that are not of type attribute or namespace, respectively. In turn, all other XPath axis functions remove nodes of these two types from their results. We can express this formally as $$\text{attribute}(S) := \text{child}(S) \cap T(\text{attribute}())$$

$$\text{namespace}(S) := \text{child}(S) \cap T(\text{namespace}())$$

and for all other XPath axes $\chi$ (let $\chi_0$ be the abstract axis of the same name), $$\chi(S) := \chi_0(S) - (T(\text{attribute}()) \cup T(\text{namespace}())).$$

Node tests that occur explicitly in XPath queries must not use the types "root", "attribute", or "namespace". Actually, these node tests are also redundant with '/' and the "attribute" and "namespace" axes. In XPath, axis applications $\chi$ and node tests t always come in location step expressions of the form $\chi::t$. The node test n (where n is a node name or the wildcard *) is a shortcut for $\tau(n)$, where $\tau$ is the principal node type of $\chi$. For the axis attribute, the principal node type is attribute, for namespace it is namespace, and for all other axes, it is element. For example, child::a is short for child::element(a) and child::* is short for child::element(*).

Note that for a set of nodes S and a typed axis $\chi$, $\chi(S)$ can be computed in linear time—just as for the untyped axes of Section B.

Let $<_{doc}$ be the binary document order relation, such that $x <_{doc} y$ (for two nodes $x, y \in \text{dom}$) iff the opening tag of x precedes the opening tag of y in the (well-formed) document. The function $\text{first}_{<_{doc}}$ returns the first node in a set w.r.t. document order. We define the relation $<_{doc,\chi}$ relative to the axis $\chi$ as follows. For $\chi \in \{\text{self, child, descendant, descendant-or-self, following-sibling, following}\}$, $<_{doc,\chi}$ is the standard document order relation $<_{doc}$. For the remaining axes, it is the reverse document order $>_{doc}$. Moreover, given a node x and a set of nodes S with $x \in S$, let $\text{idx}_\chi(x, S)$ be the index of x in S w.r.t. $<_{doc,\chi}$ (where 1 is the smallest index).

Given an XML Document Type Definition (DTD) [W2] that uses the ID/IDREF feature, some element nodes of the document may be identified by a unique id. The function $\text{deref\_ids}:\text{string} \to 2^{\text{dom}}$ interprets its input string as a whitespace-separated list of keys and returns the set of nodes whose ids are contained in that list.

The function $\text{strval}:\text{dom} \to \text{string}$ returns the string value of a node, for the precise definition of which we refer to [W4]. Notably, the string value of an element or root node x is the concatenation of the string values of descendant text nodes descendant $(\{x\}) \cap T(\text{text}())$ visited in document order. The functions to_string and to_number convert a number to a string resp. a string to a number according to the rules specified in [W4].

This concludes our discussion of the XPath data model, which is complete except for some details related to namespaces. This topic is mostly orthogonal to our discussion, and extending our framework to also handle namespaces (without a penalty with respect to efficiency bounds) is an easy exercise. To be consistent, we will not discuss the "local-name", "namespace-uri", and "name" core library functions [W4] either. Note that names used in node tests may be of the form NCName:*, which matches all names from a given namespace named NCNAME.

D Standard Semantics of Xpath

In this section, we present a concise definition of the semantics of XPath 1 [W4]. We assume the syntax of this language known, and cohere with its unabbreviated form [W4]. This means that 1. in all occurrences of the child or descendant axis in the XPath expression, the axis names have to be stated explicitly; for example, we write /descendant::a/child::b rather than //a/b.
2. Bracketed condition expressions [e], where e is an expression that produces a number (see below), correspond to [position( )=e] in unabbreviated syntax. For example, the abbreviated XPath expression //a[5], which refers to the fifth node (with respect to document order) occurring in the document which is labeled "a", is written as /descendant::a[position( )=5] in unabbreviated syntax.
3. All type conversions have to be made explicit (using the conversion functions string, number, and boolean, which we will define below). For example, we write /descendant::a[boolean(child::b)] rather than /descendant::a[child::b].

Moreover, as XPath expressions may use variables for which a given binding has to be supplied with the expression, each variable is replaced by the (constant) value of the input variable binding.

These assumptions do not cause any loss of generality, but reduce the number of cases we have to distinguish in the semantics definition below. In particular, the assumptions and restrictions imposed here are purely syntactical and our invention can be easily applied to the general XPath language by anybody skilled in the art.

The main syntactic construct of XPath are expressions, which are of one of four types, namely node set, number, string, or boolean. Each expression evaluates relative to a context $\vec{c} = \rangle x, k, n \langle$ consisting of a context node x, a context position k, and a context size n [W4]. By the domain of contexts, we mean the set $$C = \text{dom} \times \{ \rangle k, n \langle | 1 \leq k \leq n \leq |\text{dom}| \}.$$

Let
  ArithOp$\in \{+,-,*,\text{div},\text{mod}\}$,
  RelOp$\in \{=,\neq,\leq,<,\geq,>\}$,
  EqOp$\in \{=,\neq\}$, and
  GtOp$\in \{\leq,<,\geq,>\}$.

By slight abuse of notation, we identify these arithmetic and relational operations with their symbols in the remainder of this paper. However, it should be clear whether we refer to the operation or its symbol at any point. By $\pi, \pi_1, \pi_2, \ldots$ we denote location paths.

TABLE 2 standard semantics of location paths.

(* location paths relative to the root node *)
P$[\![/\pi]\!]$(x) := P$[\![\pi]\!]$(root)
(* composition of location paths *)
P$[\![\pi_1/\pi_2]\!]$(x) := $\bigcup_{y \in P[\![\pi_1]\!](x)}$ P$[\![\pi_2]\!]$(y)
(* "disjunction" of location paths *)

TABLE 2-continued standard semantics of location paths.

P$[\![\pi_1|\pi_2]\!]$(x) := P$[\![\pi_1]\!]$(x) $\cup$ P$[\![\pi_2]\!]$(x)
(* location steps *)
P$[\![\chi::t[e_1] \ldots [e_m]]\!]$(x) :=
begin
  S := {y | x$\chi$y, y $\in$ T(t)};
  for 1 $\leq$ i $\leq$ m (in ascending order) do
    S := {y $\in$ S | $[\![e_i]\!]$(y, idx$_\chi$(y, S), |S|) = true};
  return S;
end;

Definition 5 (Semantics of XPath) Each XPath expression returns a value of one of the following four types: number, node set, string, and boolean (abbreviated num, nset, str, and bool, respectively). Let T be an expression type and the semantics $[\![e]\!]: C \to T$ of XPath expression e be defined as follows.

$$[\![\pi]\!](\rangle x, k, n \langle) := P[\![\pi]\!](x)$$

$$[\![\text{position}( )]\!](\rangle x, k, n \langle) := k$$

$$[\![\text{last}( )]\!](\rangle x, k, n \langle) := n$$

$$[\![\text{text}( )]\!](\rangle x, k, n \langle) := \text{strval}(n)$$

For all other kinds of expressions $e = \text{Op}(e_1, \ldots, e_m)$ mapping a context $\vec{c}$ to a value of type T, $$[\![\text{Op}(e_1, \ldots, e_m)]\!](\vec{c}) := F[\![\text{Op}]\!]([\![e_1]\!](\vec{c}), \ldots, [\![e_m]\!](\vec{c})),$$

where $F[\![\text{Op}]\!]:T_1 \times \ldots \times T_m \to T$ is called the effective semantics function of Op. The function P is defined in Table 2 and the effective semantics function F is defined in Table 3.

To save space, we at times reuse function definitions in Table 3 to define others. However, our definitions are not circular and the indirections can be eliminated by a constant number of unfolding steps. Moreover, we define neither the number operations floor, ceiling, and round nor the string operations concat, starts-with, contains, substring-before, substring-after, substring (two versions), string-length, normalize-space, translate, and lang in Table 3, but it is very easy to obtain these definitions from the XPath 1 Recommendation [W4]. Table 3 can be considered as a parameterization of our invention, and changes of or additions to this table allow anybody skilled in the art to adapt the query language discussed here to past or future versions of XPath or a similar language.

The compatibility of our semantics definition (modulo the assumptions made in this paper to simplify the data model) with [W4] can easily be verified by inspection of the latter document.

It is instructive to compare the definition of P$[\![\pi_1/\pi_2]\!]$ in Table 2 with the procedure process-location-step of Part I, Section B.5 and the claim regarding exponential-time query evaluation made there. In fact, if the semantics definition of [W4] (or of this section, for that matter) is followed rigorously to obtain an analogous functional implementation, query evaluation using this implementation requires time exponential in the size of the queries.

E The Context-Value Table Principle

The main notion that we propose at this point to obtain an XPath evaluation method or system with polynomial-time complexity is that of a context-value table. Given an expression e that occurs in the input query, the context-value table of e specifies all valid combinations of contexts $\vec{c}$ and values v,

TABLE 3

XPath effective semantics functions.

Expr. E : Operator Signature := Semantics F[E]
F[constant number v : → num]( ) := v
F[ArithOp : num × num → num]($v_1$, $v_2$) := $v_1$ArithOp $v_2$
F[count : nset → num](S) := |S|
F[sum : nset → num](S) := $\Sigma_{n \in S}$ to_number(strval(n))
F[id : nset → nset](S) := $\cup_{n \in S}$F[id](strval(n))
F[id : str → nset](s) := deref_ids(s)
F[constant string s : → str]( ) := s
F[and : bool × bool → bool]($b_1$,$b_2$) := $b_1 \wedge b_2$
F[or : bool × bool → bool]($b_1$, $b_2$) := $b_1 \vee b_2$
F[not : bool → bool](b) := ¬b
F[true( ) : → bool]( ) := true
F[false( ) : → bool]( ) := false
F[RelOp : nset × nset → bool]($S_1$, $S_2$) :=
$\exists n_1 \in S_1, n_2 \in S_2$ : strval($n_1$) RelOp strval($n_2$)
F[RelOp : nset × num → bool](S,v) :=
$\exists n \in S$ : to_number(strval(n)) RelOp v
F[RelOp : nset × str → bool](S,s) := $\exists n \in S$ : strval(n) RelOp s
F[RelOp : nset × bool → bool](S,b) := F[boolean](S) RelOp b
F[EqOp : bool × (str ∪ num ∪ bool) → bool](b,x) :=
b EqOp F[boolean](x)
F[EqOp : num × (str ∪ num) → bool](v,x) := v EqOp F[number](x)
F[EqOp : str × str → bool]($s_1$,$s_2$) := $s_1$ EqOp $s_2$
F[GtOp : (str ∪ num ∪ bool) × (str ∪ num ∪ bool) → bool]($x_1$,$x_2$) :=
    F[number]($x_1$) GtOp F[number]($x_2$)
F[string : num → str](v) := to_string(v)
F[string : nset → str](S) := if S = ∅ then "" else strval($first_{<doc}$(S))
F[string : bool → str](b) := if b = true then "true" else "false"
F[boolean : str → bool](s) := if s ≠ "" then true else false
F[boolean : num → bool](v) := if v ≠ ±0 and v ≠ NaN
then true else false
F[boolean : nset → bool](S) := if S ≠ ∅ then true else false
F[number : str → num](s) := to_number(s)
F[number : bool → num](b) := if b=true then 1 else 0
F[number : nset → num](S) := F[number](F[string](S))

such that e evaluates to v in context $\vec{c}$. Alternatively, where appropriate, a context-value table may only hold a subset of these context-value tuples, obtained by ignoring tuples that are of no interest in a given query processing setting.

In the following, by atomic query operations, we mainly refer to ones at the (small) granularity of those of Table 3. However, any kind of operation that can be executed in polynomial time in the size of its input is applicable.

The general context-value table principle for obtaining a polynomial-time technique for processing XPath queries is, simply speaking, as follows.

Given an expression e that occurs in the input query, the context-value table of e specifies all valid combinations of contexts $\vec{c}$ and values v, such that e evaluates to v in context $\vec{c}$. Such a table for expression e is obtained by first computing the context-value tables of the direct subexpressions of e and subsequently combining them into the context-value table for e.

Given that the size of each of the context-value tables has a polynomial bound and each of the combination steps can be effected in polynomial time (all of which we can assure in the following), query evaluation in total under our principle also has a polynomial time bound. Note that the number of expressions to be considered is fixed with the parse tree of a given query.

In the following subsections, we discuss two main embodiments of this principle:

1. Bottom-up processing. The context-value table for expression e is obtained by first computing the context-value tables of the direct syntactic subexpressions of e and subsequently combining them into the context-value table for e. Given that the size of each of the context-value tables has a polynomial bound and each of the combination steps can be effected in polynomial time (all of which we can assure in the following), query evaluation in total under our principle also has a polynomial time bound. Note that the number of expressions to be considered is fixed with the parse tree of a given query.

2. Top-down processing. The computation proceeds top-down along the parse tree (expression tree) of the query, passing tables (or ordered lists, or "vectors", for that matter) of contexts down and passing up matching tables of values when returning from the descent.

Clearly, these are just two natural interpretations of the context-value table principle. Notably, we envision the possibility of processing XPath expressions not just via their strict syntactic subexpressions, but also through equivalent but syntactically different subexpressions, for optimization reasons.

TABLE 4

Expression types and associated relations.

| Expression Type | Associated Relation R |
|---|---|
| num | $R \subseteq C \times \mathbb{R}$ |
| bool | $R \subseteq C \times \{true, false\}$ |
| nset | $R \subseteq C \times 2^{dom}$ |
| str | $R \subseteq C \times char^*$ |

Moreover, for similar reasons, it is also possible to trade strict bottom-up or top-down navigation by adaptive methods and systems which combine these two strategies or use different tree navigation strategies altogether.

Finally, as a third embodiment, we show how existing XPath processors can be improved to polynomial time methods by incorporating the context-value table principle into them.

E.1 Embodiment 1

Bottom-up Evaluation of Xpath

In this section, we present a semantics and a method for evaluating XPath queries in polynomial time which both use a "bottom-up" intuition. We discuss the intuitions which lead to polynomial time evaluation (which we call the "context-value table principle"), and establish the correctness and complexity results.

Definition 6 (Semantics) We represent the four XPath expression types nset, num, str, and bool using relations as shown in Table 4. The bottom-up semantics of expressions is defined via a semantics function $\epsilon_\uparrow$:Expression→nset∪num∪str∪bool, given in Table 5 and as $$E_\uparrow[\![Op(e_1, \ldots, e_m)]\!] := \{\langle \vec{c}, F[\![Op]\!](v_1, \ldots, v_m)\rangle |$$
$$\vec{c} \in C, \langle \vec{c}, v_1\rangle \in E_\uparrow[\![e_1]\!], \ldots, \langle \vec{c}, v_m\rangle \in E_\uparrow[\![e_m]\!]\}$$

for the remaining kinds of XPath expressions.

Now, for each expression e and each $(x, k, n) \in C$, there is exactly one v s.t. $(x, k, n, v) \in E_\uparrow \llbracket e \rrbracket$, and which happens to be the value $\llbracket e \rrbracket (\langle x, k, n \rangle)$ of e on $(x, k, n)$ (see Definition 5). We thus immediately get the following correctness result:

Let e be an arbitrary XPath expression, $\langle x, k, n \rangle \in C$ a context, and $v = \llbracket e \rrbracket(\langle x, k, n \rangle)$ the value of e. Then, v is the unique value such that $\langle x, k, n, v \rangle \in E_\uparrow \llbracket e \rrbracket$.

Query Evaluation. The idea of Procedure 7 below is so closely based on our semantics definition that its correctness follows directly from the above correctness result.

TABLE 5

Expression relations for location paths, position( ), last( ), and text( ).

Expr. E : Operator Signature
Semantics $\epsilon \uparrow [E]$
location step $\chi::t : \rightarrow$ nset
$\{<x_0, k_0, n_0, \{x \mid x_0 \chi x, x \in T(t)\}> \mid <x_0, k_0, n_0> \in C\}$
location step $E[e]$ over axis $\chi$ : nset × bool $\rightarrow$ nset
$\{<x_0, k_0, n_0, \{x \in S \mid <x, idx_\chi(x, S), |S|, true> \in \epsilon\uparrow[e]\}> \mid <x_0, k_0, n_0, S> \in \epsilon\uparrow[E]\}$
location path $/\pi$ : nset $\rightarrow$ nset
$C \times \{S \mid \exists k, n : <root, k, n, S> \in \epsilon\uparrow[\pi]\}$
location path $\pi_1/\pi_2$ : nset × nset $\rightarrow$ nset
$\{<x, k, n, \cup\{Z \mid <y, k_2, n_2, Z> \in \epsilon\uparrow[\pi_2], y \in Y\}> \mid 1 \leq K \leq n \leq |dom|, <x, k_1, n_1, Y> \in \epsilon\uparrow[\pi_1]\}$
location path $\pi_1 \mid \pi_2$ : nset × nset $\rightarrow$ nset
$\{<x, k, n, S_1 \cup S_2> \mid <x, k, n, S_1> \in \epsilon\uparrow[\pi_1], <x, k, n, S_2> \in \epsilon\uparrow[\pi_2]\}$
position( ) : $\rightarrow$ num
$\{<x, k, n, k> \mid <x, k, n> \in C\}$
last( ) : $\rightarrow$ num
$\{<x, k, n, n> \mid <x, k, n> \in C\}$
text( ) : $\rightarrow$ str
$\{<x, k, n, strval(x)> \mid <x, k, n> \in C\}$ Procedure 7 (Bottom-up evaluation of XPath)
Input: An XPath query Q;
Output: $\epsilon_\uparrow[Q]$.
Method:
let Tree(Q) be the parse tree of query Q;
R := $\emptyset$; (* a set of context-value tables *)
for each atomic expression $l \in$ leaves(Tree(Q)) do compute table $\epsilon_\uparrow[l]$ and add it to R;
while $\epsilon_\uparrow[\text{root}(\text{Tree}(Q))] \notin R$ do
begin
   take an $Op(l_1, \ldots, l_n) \in$ nodes(Tree(Q)), s.t. $\epsilon_\uparrow[l_1], \ldots, \epsilon_\uparrow[l_n] \in R$;
   compute $\epsilon_\uparrow[Op(l_1, \ldots, l_n)]$ using $\epsilon_\uparrow[l_1], \ldots, \epsilon_\uparrow[l_n]$;
   add $\epsilon_\uparrow[Op(l_1, \ldots, l_n)]$ to R;
end;
return $\epsilon_\uparrow[\text{root}(\text{Tree}(Q))]$.

Now let Q denote an arbitrary XPath expression and let D be an XML document. Moreover, suppose that we want to evaluate Q for the context $\langle x, k, n \rangle \in C$. Then this can be achieved as follows: First the context-value tables of all subexpressions of Q are computed via Procedure 7. Then we select the quadruple $\langle x', k', n', v' \rangle$ from the context-value table of the root of the query-tree, such that the input context $\langle x, k, n \rangle$ coincides with the first three components of $\langle x', k', n', v' \rangle$, i.e., $x=x'$, $k=k'$, $n=n'$. Thus, by the definition of context-value tables, the final result of the evaluation of Q for the context $\langle x, k, n \rangle$ is precisely the fourth component $v'$ of the selected quadruple $\langle x', k', n', v' \rangle$. Example 8 below will help to illustrate this method.

TABLE 6

Context-value tables of Example 8.

| $\epsilon_\uparrow[E_3]$ | | $\epsilon_\uparrow[E_2]$ | | $\epsilon_\uparrow[E_1]$ | | $\epsilon_\uparrow[Q]$ | |
|---|---|---|---|---|---|---|---|
| x | val | x | val | x | val | x | val |
| $b_1$ | $\{b_2, b_3, b_4\}$ | $b_1$ | $\{b_2, b_3\}$ | r | $\{b_1, b_2, b_3, b_4\}$ | r | $\{b_2, b_3\}$ |
| $b_2$ | $\{b_3, b_4\}$ | $b_2$ | $\{b_3\}$ | a | $\{b_1, b_2, b_3, b_4\}$ | a | $\{b_2, b_3\}$ |
| $b_3$ | $\{b_4\}$ | | | | | | |

EXAMPLE 8

Consider document DOC(4) of Part I, Section B.5. Let dom=$\{r, a, b_1, \ldots, b_4\}$, where r denotes the root node, a the document element node (the child of r, labeled a) and $b_1, \ldots, b_4$ denote the children of a in document order (labeled b). We want to evaluate the XPath query Q, which reads as descendant::b/following-sibling::*[position( ) !=last( )]

over the input context (a, 1, 1). We illustrate how this evaluation can be done using Procedure 7: First of all, we have to set up the parse tree of Q with its 6 proper subexpressions $E_1, \ldots, E_6$ (see FIG. 4). Then we compute the context-value tables of the leaf nodes $E_1$, $E_3$, $E_5$ and $E_6$ in the parse tree, and from the latter two the table for $E_4$. By combining $E_3$ and $E_4$, we obtain $E_2$, which is in turn needed for computing Q. The tables for $E_1$, $E_2$, $E_3$ and Q are shown in Table 6. Note that the k and n columns have been omitted. Full tables are obtained by computing the Cartesian product of each table with $\{\langle k,n \rangle | 1 \leq k \leq n \leq |dom|\}$.

Moreover, we have $E_\uparrow[E_5] = \{\langle x, k, n, k \rangle | \langle x, k, n \rangle \in C\}$ $E_\uparrow[E_6] = \{\langle x, k, n, n \rangle | \langle x, k, n \rangle \in C\}$ $E_\uparrow[E_4] = \{\langle x, k, n, k \neq n \rangle | \langle x, k, n \rangle \in \epsilon\}$ The most interesting step is the computation of $E_\uparrow[E_2]$ from the tables for $E_3$ and $E_4$. For instance, consider $\langle b_1, k, n, \{b_2, b_3, b_4\}\rangle [\epsilon E_\uparrow[E_3]]$. $b_2$ is the first, $b_3$ the second, and $b_4$ the third of the three siblings following $b_1$. Thus, only for $b_2$ and $b_3$ is the condition $E_2$ (requiring that the position in set $\{b_2, b_3, b_4\}$ is different from the size of the set, three) satisfied. Thus, we obtain the tuple $\langle b_1, k, n, \{b_2, b_3\}\rangle$ which we add to $E_\uparrow[\![E_2]\!]$. In order to read out the final result from the context-value table of Q, we have to select the second row of this table since this entry corresponds to the input context-node a. Hence, we get the final result $\{b_2, b_3\}$.

As far as the complexity of Procedure 7 is concerned, the following property can be shown:

XPath can be evaluated bottom-up in polynomial time (combined complexity).

This can be seen as follows: Let $|Q|$ be the size of the query and $|D|$ be the size of the data. During the bottom-up computation of a query Q using Procedure 7, $O(|Q|)$ relations ("context-value tables") are created. All relations have a functional dependency from the context (columns one to three) to the value (column four). The size of each relation is $O(|D|^3)$ times the maximum size of such values. The size of bool relations is bounded by $O(|D|^3)$ and the size of nset relations by $o(|D|^4)$.

Numbers and strings computable in XPath are of size $O(|D|\cdot|Q|)$: "concat" on strings and arithmetic multiplication on numbers are the most costly operations (w.r.t. size increase of values) on strings and numbers. Recall that for the conversion from a node set to a string or number, only the first node in the set is chosen. Of the string functions, only "concat" may produce a string longer than the input strings. The "translate" function of [W4], for instance, does not allow for arbitrary but just single-character replacement, e.g. for case-conversion purposes.

Hence, the lengths of the argument values add up such that we get to sizes $O(|D|\cdot|Q|)$ at worst, even in the relation representing the "top" expression Q itself. The overall space bound of $o(|D|^4\cdot|Q|^2)$ follows. Note that no significant additional amount of space is required for intermediate computations.

Let each context-value table be stored as a three-dimensional array, such that we can find the value for a given context $(x, k, n)$ in constant time. Given m context-value tables representing expressions $e_1, \ldots, e_m$ and a context $\langle x, k, n \rangle$, any m-ary XPath operation $Op(e_1, \ldots, e_m)$ on context $\langle x, k, n \rangle$ can be evaluated in time $O(|D|\cdot I)$; again, I is the size of the input values and thus $O(|D|\cdot|Q|)$. This is not difficult to verify; it only takes very standard techniques to implement the XPath operations according to the definitions of Table 3 (sometimes using auxiliary data structures created in a preprocessing step). The most costly operator is RelOp : nset×nset→bool, and this one also takes the most ingenuity. We assume a pre-computed table $$\{\langle n_1, n_2\rangle | n_1, n_2 \in dom, strval(n_1)\ RelOp\ strval(n_2)\}$$

with which we can carry out the operation in time $O(|D|^2)$ given two node sets.

It becomes clear that each of the expression relations can be computed in time $O(|D|^3\cdot|D|^2\cdot|Q|)$ at worst when the expression semantics tables of the direct subexpressions are given. (The $|Q|$ factor is due to the size bound on strings and numbers generated during the computation.) Moreover, $O(|Q|)$ such computations are needed in total to evaluate Q. The $O(|D|^5\cdot|Q|^2)$ time bound follows.

Note that contexts can also be represented in terms of pairs of a current and a "previous" context node (rather than triples of a node, a position, and a size), which are defined relative to an axis and a node test (which, however, are fixed with the query). For instance, the corresponding ternary context for $\vec{c} = (x_0, x)$ w.r.t. axis $\chi$ and node test t is $(x, idx_\chi(x, Y), |Y|)$, where $Y=\{y | x_0 \chi y, y \in T(t)\}$. Thus, position and size values can be recovered on demand.

Moreover, it is possible to represent context-value tables of node set-typed expressions just as binary unnested relations (indeed, a construction that contains a previous node, a current node, and a node set as value would represent two location steps rather than one). Note that to move to this alternative form of representation, a number of changes in various aspects of our construction are necessary, which we do not describe here in detail. Through these two changes, it is possible to obtain an improved worst-case time bound of $O(|D|^4\cdot|Q|^2)$ for the bottom-up XPath query evaluation.

E.2 Embodiment 2: Top-down Evaluation of XPath

In the previous section, we obtained a bottom-up semantics definition which led to a polynomial-time query evaluation method for XPath. Despite this favorable complexity bound, the bottom-up technique of Embodiment 1 can be further improved, since usually many irrelevant intermediate results are computed to fill the context-value tables which are not used later on. Next, building on the context-value table principle of Section E.1, we develop a top-down evaluation method based on vector computation for which the favorable (worst-case) complexity bound carries over but in which the computation of a large number of irrelevant results is avoided.

Given an m-ary operation Op: $D^m \to D$, its vectorized version $Op\langle\rangle: (D^k)^m \to D^k$ is defined as $$Op\langle\rangle(\langle x_{1,1}, \ldots, x_{1,k}\rangle, \ldots, \langle x_{m,1}, \ldots, x_{m,k}\rangle) := \langle Op(x_{1,1}, \ldots, x_{m,1}), \ldots, Op(x_{1,k}, \ldots, x_{m,k})\rangle$$

For instance, $\langle X_1, \ldots, X_k\rangle \cup \langle\rangle \langle Y_1, \ldots, Y_k\rangle := \langle X_1 \cup Y_1, \ldots, X_k \cup Y_k\rangle$. Let $$S_\downarrow: LocationPath \to List(2^{dom}) \to List(2^{dom})$$

be the auxiliary semantics function for location paths defined in Table 7. We basically distinguish the same cases (related to location paths) as for the bottom-up semantics $E_\uparrow[\![\pi]\!]$. Given location path $\pi$ and a list $[_{X1}, \ldots, X_k]$ of node sets, $S_\downarrow$ determines a list $\langle Y_1, \ldots, Y_k\rangle$ of node sets, s.t. for every

TABLE 7

Top-down evaluation of location paths.

(∗ location paths relative to the root node ∗)
$S_\downarrow[\![/\pi]\!](X_1, \ldots, X_k) := S_\downarrow[\![\pi]\!]\underbrace{(\{root\}, \ldots, \{root\})}_{k\ times}$ (∗ composition of location paths ∗)
$S_\downarrow[\![\pi_1 / \pi_2]\!](X_1, \ldots, X_k) := S_\downarrow[\![\pi_2]\!](S_\downarrow[\![\pi_1]\!](X_1, \ldots, X_k))$ (∗ "disjunction" of location paths ∗)
$S_\downarrow[\![\pi_1 | \pi_2]\!](X_1, \ldots, X_k) := S_\downarrow[\![\pi_1]\!](X_1, \ldots, X_k) \cup^\Diamond (S_\downarrow[\![\pi_2]\!](X_1, \ldots, X_k))$ (∗ location steps ∗)
$S_\downarrow[\![\chi::t[e_1]\ldots[e_m]]\!](X_1, \ldots, X_k) :=$
begin
　　$S := \{\langle x, y\rangle | x \in \bigcup_{i=1}^k X_i, x \chi y, \text{ and } y \in T(t)\};$
　　for each $1 \le i \le m$ (in ascending order) do
　　begin
　　　　for each x, let $S_x = \{z | \langle x, z\rangle \in S\};$
　　　　for $\langle x, y\rangle \in S$,
　　　　　　let $Ct_S(x, y) = \langle y, idx_\chi(y, S_x), |S_x|\rangle;$ TABLE 7-continued Top-down evaluation of location paths.

$T := [Ct_S(x, y) | \langle x, y \rangle \in S];$
let $T = \{t_1, \ldots, t_l\};$ (* we fix some order on T *)
$\langle r_1, \ldots, r_l \rangle := \mathcal{E}_\downarrow[e_i](t_1, \ldots, t_l);$
$S := \{\langle x, y \rangle \in S | \exists i : t_i = Ct_S(x, y) \wedge r_i \text{ is true}\};$
end;
for each $1 \leq i \leq k$ do
$R_i := \{y | \langle x, y \rangle \in S, x \in X_i\};$
return $\langle R_1, \ldots, R_k \rangle;$
end;

$i \in \{1, \ldots k\}$, the nodes reachable from the context nodes in $X_i$ via the location path $\pi$ are precisely the nodes in $Y_i$. $S_\downarrow[\pi]$ can be obtained from the relations $E_\uparrow[\pi]$ as follows. A node y is in $Y_i$ iff there is an $x \in X_i$ and such that $\langle x, p, s, y \rangle \in E_\uparrow[\pi]$ for some numbers p and s.

Definition 9 The semantics function $E_\downarrow$ for arbitrary XPath expressions is of the following type:

$E_\downarrow$: XPathExpression→List(C)→List(XPathType)

Given an XPath expression e and a list $(\vec{c}_1, \ldots, \vec{c}_l)$ of contexts, $E_\downarrow$ determines a list $\langle r_1, \ldots, r_l \rangle$ of results of one of the XPath types number, string, boolean, or node set. $E_\downarrow$ is defined as $E_\downarrow[\pi](\langle x_1, k_1, n_1 \rangle, \ldots, \langle x_l, k_l, n_l \rangle) := S_\downarrow\langle \pi \rangle(\{x_1\}, \ldots, \{x_l\})$ $E_\downarrow[\text{position}( )](\langle x_1, k_1, n_1 \rangle, \ldots, \langle x_l, k_l, n_l \rangle) := \langle K_1, \ldots, k_l \rangle$ $E_\downarrow[\text{last}( )](\langle x_1, k_1, n_1 \rangle, \ldots, \langle x_l, k_l, n_l \rangle) := \langle n_1, \ldots, n_l \rangle$ $E_\downarrow[\text{text}( )](\langle x_1, k_1, n_1 \rangle, \ldots, \langle x_l, k_l, n_l \rangle) := \langle \text{strval}(x_1), \ldots, \text{strval}(x_l) \rangle$ and $E_\downarrow[\text{Op}(e_1, \ldots, e_m)](\vec{c}_1, \ldots, \vec{c}_l) := F[\text{Op}] \langle \rangle (E_\downarrow[e_1](\vec{c}_1, \ldots, \vec{c}_l), \ldots, E_\downarrow[e_m](\vec{c}_1, \ldots, \vec{c}_l))$ for the remaining kinds of expressions.

EXAMPLE 10

$E_\downarrow[e_1 \text{ ArithOp } e_2](\vec{c}_1, \ldots, \vec{c}_l) := E_\downarrow[e_1](\vec{c}_1, \ldots, \vec{c}_l)$
$\text{ArithOp}\langle \rangle E_\downarrow[e_2](\vec{c}_1)$ $E_\downarrow[\text{count}(e)](\vec{c}_1, \ldots, \vec{c}_l) := \text{count}\langle \rangle (E_\downarrow[e](\vec{c}_1, \ldots, \vec{c}_l))$ $E_\downarrow[e_1 \text{ RelOp } e_2: \text{num} \times \text{num} \rightarrow \text{bool}](\vec{c}_1, \ldots, \vec{c}_l) :=$
$E_\downarrow[e_1](\vec{c}_1, \ldots, \vec{c}_l) \text{ RelOp}\langle \rangle E_\downarrow[e_2](\vec{c}_1, \ldots, \vec{c}_l)$

EXAMPLE 11

Consider the XPath query

/descendant::a[count(descendant::b/child::c)+position( )<last( )/child::d

Let $L = \langle \langle y_1, 1, l \rangle, \ldots \langle y_l, 1, l \rangle \rangle$, where the $y_i$ are those nodes reachable from the root node through the descendant axis and which are labeled "a". The query is evaluated top-down as $S_\downarrow[\text{child::d}](S_\downarrow[\text{descendant::a}[e]](\{\text{root}\}))$ where $E_\downarrow[e](L)$ is computed as $F[\text{count}]\langle \rangle(\pi) + \langle \rangle E_\downarrow[\text{position}( )\quad](L) < \langle \rangle$
$E_\downarrow[\text{last}( )](L)$ and $\pi = S_\downarrow[\text{child::}c](S_\downarrow[\text{descendant::}b](\{y_1\}, \ldots, \{y_l\})).$ Note that the arity of the tuples used to compute the outermost location path is one, while it is l for e.

EXAMPLE 12

Given the query Q, data, and context $\langle a, 1, 1 \rangle$ of Example 8, we evaluate Q as $E_\downarrow[Q](\langle a, 1, 1 \rangle) = S_\downarrow[E_2](S_\downarrow[\text{descendant::}b](\{a\}))$. Again, $E_2$ is the subexpression following-sibling::*[position( ) !=last( )].

First, we obtain $S_\downarrow[\text{descendant::}b](\{a\}) = \langle \{b_1, b_2, b_3, b_4\} \rangle$. To compute the location step $S_\downarrow[E_2](\langle \{b_1, b_2, b_3, b_4\} \rangle)$, we proceed as described in the method of Table 7. We initially obtain the set $S = \{\langle b_1, b_2 \rangle, \langle b_1, b_3 \rangle, \langle b_1, b_4 \rangle, \langle b_2, b_3 \rangle, \langle b_2, b_4 \rangle, \langle b_3, b_4 \rangle\}$ and the list of contexts $\vec{t} = \langle \langle b_2, 1, 3 \rangle, \langle b_3, 2, 3 \rangle, \langle b_4, 3, 3 \rangle, \langle b_3, 1, 2 \rangle, \langle b_4, 2, 2 \rangle, \langle b_4, 1, 1 \rangle \rangle.$ The check of condition $E_4$ returns the filter $\vec{r} = \langle \text{true, true, false, true, false, false} \rangle.$ which is applied to S to obtain $S = \{\langle b_1, b_2 \rangle, \langle b_1, b_3 \rangle, \langle b_2, b_3 \rangle\}$ Thus, the query returns $\langle \{b_2, b_3\} \rangle$.

The correctness of the top-down semantics follows immediately from the corresponding result in the bottom-up case and from the definition of $S_\downarrow$ and $E_\downarrow$. We thus have:

Let e be an arbitrary XPath expression. Then, $\langle v_1, \ldots, v_l \rangle = E_\downarrow[e](\vec{c}_1, \ldots, \vec{c}_l)$, if amd only if $\langle \vec{c}_1, v_1 \rangle, \ldots, \langle \vec{c}_l, v_l \rangle \in E_\downarrow[e].$ $S_\downarrow$ and $E_\downarrow$ can be immediately transformed into function definitions in a top-down evaluation method. We thus have to define one evaluation function for each case of the definition of $S_\downarrow$ and $E_\downarrow$, respectively. The functions corresponding to the various cases of $S_\downarrow$ have a location path and a list of node sets of variable length $(X_1, \ldots, X_k)$ as input parameter and return a list $(R_1, \ldots, R_k)$ of node sets of the same length as result. Likewise, the functions corresponding to $E_\downarrow$ take an arbitrary XPath expression and a list of contexts as input and return a list of XPath values (which can be of type num, str, bool or nset). Moreover, the recursions in the definition of $S_\downarrow$ and $E_\downarrow$ correspond to recursive function calls of the respective evaluation functions.

Now suppose that we want to evaluate an arbitrary XPath expression Q over some XML document D for some context $\langle x, k, n \rangle \in C$. Then we would simply have to call the functional implementation of $E_\downarrow[Q](\vec{c})$ with $\vec{c} = \langle x, k, n \rangle$. The return value of this function call is the desired evaluation.

Analogously to the complexity of the bottom-up procedure from Section E.1, the following property of the top-down evaluation method can be shown:

The immediate functional implementation of $E_\downarrow$ evaluates XPath queries in polynomial time (combined complexity).

Finally, note that using arguments relating the top-down method of this section with (join) optimization techniques in relational databases, one may argue that the context-value table principle is also the basis of the above mentioned polynomial-time bound of the top-down evaluation method.

E.3 Embodiment 3

Improving Existing Xpath-Processors

Those skilled in the art will recognize that an embodiment of the disclosed invention can also be obtained from an existing method or system for evaluating XPath queries such as, e.g., IE6, Saxon, Xalan-C++, Xalan-Java, XT (cf. [H1, H2, H3, H4]), etc. by improving said systems as follows:

During the evaluation process of some input XPath query Q, all of the existing methods or systems repeatedly evaluate subexpressions e of Q for contexts $\vec{c} \in C$, where $\vec{c}$ is of the form $\vec{c} = \langle x, k, n \rangle$ for some context-node x, context-position I, and context-size n. In contrast to the method described in this document, the existing methods and systems, in general, do the evaluation of the same subexpression e of Q for the same context $\vec{c} \in C$ more than once. This is the very reason why their time complexity is, in general, exponential. By incorporating data structures analogous to the context-value tables described in Section E.1, multiple evaluations of the same subexpression e of Q for the same context $\vec{c} \in C$ can be avoided, thus reducing the time complexity to polynomial time. The data structures used for this purpose will be referred to as "data pool". It contains triples of the form $\langle e, \vec{c}, v \rangle$, where e is a subexpression of the input XPath query Q, $\vec{c} \in C$ is a context, and v is the result value obtained when evaluating e for the context $\vec{c}$. In other terms, $(\vec{c}, v)$ can be considered as a row in the context-value table corresponding to e. Initially, the data pool is empty, i.e., it contains no such triples.

In order to guarantee that no evaluation of the same subexpression e for the same context $\vec{c}$ is done more than once, we have to add two further components to the existing methods and systems, namely a "storage procedure" and a "retrieval procedure". Prior to the evaluation of any subexpression e for any context $\vec{c}$, the retrieval procedure is called, which checks whether a triple $\langle e', \vec{c}', v \rangle$ with e=e' and $\vec{c} = \vec{c}'$ already exists in the data pool. If this is the case, then the result value v of e for the context $\vec{c}$ is returned without further computation. On the other hand, after the evaluation of any subexpression e for any context $\vec{c}$ yielding the result value v, the storage procedure stores the triple $\langle e, \vec{c}, v \rangle$ in the data pool.

Let the basic evaluation step of an existing method or system be referred to as "atomic-evaluation", which takes an XPath expression e and a context $\vec{c}$ as an input and returns the corresponding result value v. Then this "atomic-evaluation" simply has to be replaced by the following procedure based on the context-value table principle:

---

Procedure 13 (Improved Basic Evaluation Step)
Input: An XPath expression e and a context $\hat{c}$.
Output: The result value v of e for the context $\hat{c}$.
Method:
function atomic-evaluation-CVT (e, $\hat{c}$)
begin
/* retrieval procedure */
   if there exists a v, s.t. <e, $\hat{c}$, v> is in the data pool then
     return v;
   else begin
/* basic evaluation step of the existing method or system */
     v := atomic-evaluation (e, $\hat{c}$);
/* storage procedure */
     store <e, $\hat{c}$, v> in the data pool;
/* return the result */
     return v;
   end;
end;

---

Analogously to the Sections E.1 and E.2, we get the following complexity result:

The complexity of existing methods and systems for evaluating XPath queries can be reduced to polynomial time, if each execution of the basic evaluation step "atomic-evaluation (e, $\vec{c}$)" is replaced by the corresponding step "atomic-evaluation-CVT (e, $\vec{c}$)" according to Procedure 13 above.

F Core Xpath and Xpatterns

F.1 Embodiment 4

Linear Time Evaluation of Core Xpath

In this section, we define a fragment of XPath (called Core XPath) which constitutes a clean logical core of XPath. The only objects that are manipulated in this language are sets of nodes (i.e., there are no arithmetical or string operations). Besides from these restrictions, the full power of location paths is supported, and so is the matching of such paths in condition predicates (with an "exists" semantics), and the closure of such condition expressions with respect to boolean operations "and", "or", and "not".

We define a mapping of each query in this language to a simple algebra over the set operations $\cap, \cup, '-', \chi$ (the axis functions from Definition 2), and an operation $$\frac{\mathrm{dom}}{\mathrm{root}}(S) := \{x \in \mathrm{dom} \mid \mathrm{root} \in S\},$$

i.e. $\frac{\mathrm{dom}}{\mathrm{root}}(S)$ is dom if root$\in$S and $\emptyset$ otherwise.

Note that each XPath axis has a natural inverse: $\mathrm{self}^{-1}=\mathrm{self}$, $\mathrm{child}^{-1}=\mathrm{parent}$, $\mathrm{descendant}^{-1}=\mathrm{ancestor}$, $\mathrm{descendant\text{-}or\text{-}self}^{-1}=\mathrm{ancestor\text{-}or\text{-}self}$, $\mathrm{following}^{-1}=\mathrm{preceding}$, and $\mathrm{following\text{-}sibling}^{-1}=\mathrm{preceding\text{-}sibling}$. Then the following relation between axes and inverse axes can be proved by a very easy induction.

Let $\chi$ be an axis. For each pair of nodes x,y∈dom, x$\chi$y iff y$\chi^{-1}$x.

Definition 14 Let the (abstract) syntax of the Core XPath language be defined by the EBNF grammar cxp: locationpath |'/' locationpath
locationpath: locationstep ('/' locationstep)*
locationstep: $\chi$ '::' | $\chi$ '::' t '['pred ']'
pred: pred 'and' pred |pred 'or' pred |'not' '(' pred ')' | cxp
  | '(' pred ')'

"cxp" is the start production, $\chi$ stands for an axis (see above), and t for a "node test" (either an XML tag or "*", meaning "any label"). The semantics of Core XPath queries is defined by a function $S_\rightarrow$ $$S_\rightarrow[\![\chi :: t[e]]\!](N_0) := \chi(N_0) \cap T(t) \cap \varepsilon_1[\![e]\!]$$

$$S_\rightarrow[\![/\chi :: t[e]]\!](N_0) := \chi(\{root\}) \cap T(t) \cap \varepsilon_1[\![e]\!]$$

$$S_\rightarrow[\![\pi/\chi :: t[e]]\!](N_0) := \chi(S_\rightarrow[\![\pi]\!](N_0)) \cap T(t) \cap \varepsilon_1[\![e]\!]$$

$$S_\leftarrow[\![\chi :: t[e]]\!] := \chi^{-1}(T(t) \cap \varepsilon_1[\![e]\!])$$

$$S_\leftarrow[\![\chi :: t[e]/\pi]\!] := \chi^{-1}(S_\leftarrow[\![\pi]\!] \cap T(t) \cap \varepsilon_1[\![e]\!])$$

$$S_\leftarrow[\![\pi]\!] := \frac{dom}{root}(S_\leftarrow[\![\pi]\!])$$

$$\varepsilon_1[\![e_1 \text{ and } e_2]\!] := \varepsilon_1[\![e_1]\!] \cap \varepsilon_1[\![e_2]\!]$$

$$\varepsilon_1[\![e_1 \text{ or } e_2]\!] := \varepsilon_1[\![e_1]\!] \cup \varepsilon_1[\![e_2]\!]$$

$$\varepsilon_1[\![\text{not}(e)]\!] := dom - \varepsilon_1[\![e]\!]$$

$$\varepsilon_1[\![\pi]\!] := S_\leftarrow[\![\pi]\!]$$

where $N_0$ is a set of context nodes or dom and a query $\pi$ evaluates as $S_\rightarrow[\![\pi]\!](N_0)$.

EXAMPLE 15

The Core XPath Query
/descendant::a/child::b[child::c/child::d or not (following::*)]

is evaluated as specified by the query-tree depicted in FIG. 5.

(Note that there are alternative but equivalent query-trees due to the associativity and commutativity of some of our operators.)

The semantics of XPath and Core XPath (defined using $S_\leftarrow$, $S_\rightarrow$, and $E_1$) coincide in the following way:

Let $\pi$ be a Core XPath query and $N_0 \subseteq dom$ be a set of context nodes. Then, $$S_\leftarrow[\![\pi]\!] = \{x | S_\downarrow[\![\pi]\!](\{x\}) \neq \emptyset\}$$

$$E_1[\![e]\!] = \{x | E_\downarrow[\![e]\!](\{\langle x, 1, 1 \rangle\})\}$$

$$\langle S_\rightarrow[\![\pi]\!](N_0) \rangle = S_\downarrow[\![\pi]\!](\langle N_0 \rangle).$$

This can be shown by easy induction proofs. Thus, Core XPath (evaluated using $S_\rightarrow$) is a fragment of XPath, both syntactically and semantically. Moreover, for the complexity of our evaluation method of Core XPath, we get:

Core XPath queries can be evaluated in time O(|D|*|Q|), where |D| is the size of the data and |Q| is the size of the query.

This property can be shown as follows: Given a query Q, it can be rewritten into an algebraic expression E over the operations $\chi$, ∪, ∩, '−', and using $S_\rightarrow$, $S_\leftarrow$, and $\varepsilon_1$ in time O(|Q|). Each of the operations in our algebra can be carried out in time O(|D|). Since at most O(|Q|) such operations need to be carried out to process E, the complexity bound follows.

F.2 Embodiment 5
Linear Time Evaluation of XPatterns

We extend our linear-time fragment Core XPath by the operation id: nset→nset of Table 3 by defining "id" as an axis relation $$id: id := \{\langle x_0, x \rangle | x_0 \in dom, x \in deref\_ids(strval(x_0))\}$$

Queries of the form $\pi_1/id(\pi_2)/\pi_3$ are now treated as $\pi_1/\pi_2/id/\pi_3$.

Then, analogously to Section F.1, the following relationship between the semantics functions $S_\downarrow$ and $S_\rightarrow$ holds:

Let $\pi_1/id(\pi_2)/\pi_3$ be an XPath query s.t. $\pi_1/\pi_2/id/\pi_3$ is a query in Core XPath with the "id" axis. Then, the semantics of the two queries relative to a set of context nodes $N_0 \in dom$ coincide, $S_\downarrow[\![\pi_1/id(\pi_2)/\pi_3]\!](\langle N_0 \rangle) = S_\rightarrow[\![\pi_1/\pi_2/id/\pi_3]\!](N_0)$.

Likewise, the complexity result from Section F.1 can be extended to CoreXPath plus the "id" axis, namely:

Queries in Core XPath with the "id" axis can be evaluated in time O(|D|*|Q|).

The crucial part to see this complexity bound is an appropriate definition of a function id: $2^{dom} \rightarrow 2^{dom}$ and its inverse consistent with the functions of Definition 2 which is computable in linear time. We make use of a binary auxiliary relation "ref" which contains a tuple of nodes $\langle x, y \rangle$ iff the text belonging to x in the XML document, but which is directly inside it and not further down in any of its descendants, contains a whitespace-separated string referencing the identifier of node y.

Example. Let id(i)=$n_i$. For the XML document $\langle t$ id=1$\rangle$ 3 $\langle t$ id=2$\rangle$ 1 $\langle /t \rangle$ $\langle t$ id=3$\rangle$ 1 2 $\langle /t \rangle$ $\langle /t \rangle$, we have ref:={$\langle n_1, n_3 \rangle$, $\langle n_2, n_1 \rangle$, $\langle n_3, n_1 \rangle$, $\langle n_3, n_2 \rangle$}.

"ref" can be efficiently computed in a preprocessing step. It does not satisfy any functional dependencies, but it is guaranteed to be of linear size w.r.t. the input data (however, not in the tree nodes). Now we can encode id(S) as those nodes reachable from S and its descendants using "ref".

id(S):={y|x∈descendant-or-self(S), $\langle x, y \rangle \in$ref}
id$^{-1}$(S):=ancestor-or-self({x|$\langle x, y \rangle \in$ref, y∈S})

This computation can be performed in linear time.

We may define XPatterns as the smallest language that subsumes Core XPath and the XSLT Pattern language of [W3] (see also [S5] for a good and formal overview of this language) and is (syntactically)

TABLE 8

Some unary predicates of XLST Patterns [W3].

"@n", "@*", "text( )", "comment( )", "pi(n)", and
"pi( )" (where n is a label) are simply sets provided with
the document (similar to those obtained through the
node test function T).
"=s" (s is a string) can be encoded as a unary predicate TABLE 8-continued Some unary predicates of XLST Patterns [W3].

whose extension can be computed using string search in the document before the evaluation of our query starts. Clearly, this can be done in linear time.
  first-of-any := {y ∈ dom | ∄x : nextsibling(x, y)}
  last-of-any := {x ∈ dom | ∄y : nextsibling(x, y)}
"id(s)" is a unary predicate and can easily be computed (in linear time) before the query evaluation.

contained in XPath. Stated differently, it is obtained by extending the language of [W3] without the first-of-type and last-of-type predicates (which do not exist in XPath) to support all of the XPath axes. As pointed out in the introduction, XPatterns is an interesting and practically useful query language. It can be shown that XPatterns queries have the following computational property:

Let D be an XML document and Q be an XPatterns query. Then, Q can be evaluated on D in time O(|D|*|Q|).

This property is essentially due to the following fact: XPatterns extends Core XPath by the "id" axis and a number of features which are definable as unary predicates, of which we give an overview in Table 8. It becomes clear by considering the semantics definition of [S5] that after parsing the query, one knows of a fixed number of predicates to populate, and this action takes time O(|D|) for each. Thus, since this computation precedes the query evaluation—which has a time bound of O(|D|*|Q|)—this does not pose a problem. "id(s)" (for some fixed string s) may only occur at the beginning of a path, thus in a query of the form id(s)/π, π is evaluated relative to the set id(s) just as, say, {root} is for query /π.

Let Σ be a finite set of all possible node names that a document may use (e.g., given through a DTD). Note that the unary first-of-type and last-of-type predicates can be computed in time O(|D|*|Σ|) when parsing the document, but are of size O(|D|):

$$\text{first-of-type}() := \bigcup_{l \in \Sigma} (T(l) - \text{nextsibling}^+(T(l)))$$

$$\text{last-of-type}() := \bigcup_{l \in \Sigma} (T(l) - (\text{nextsibling}^{-1})^+(T(l)))$$

where $R^+ = R.R^*$.

G Empiric Results

In the previous sections, we presented the first XPath query evaluation methods and systems that run in polynominal time with respect to the size of both the data and of the query. Our results will empower XPath engines to be able to deal efficiently with very sophisticated queries.

We have made a main-memory implementation of the top-down evaluation method of Section E.2. Table 9 compares it to IE6 along the assumptions made in Experiment 2 (i.e., the queries of which were strictly the most demanding of all three experiments). It shows that our method and system scales linearly in the size of the queries and quadratically (for this class of queries) in the size of the data.

TABLE 9

Benchmark results in seconds for IE6 vs. our implementation ("New"), on the queries of Experiment 2 and document sizes 10, 20, and 200.

| |Q| | IE6 10 | IE6 20 | IE6 200 | New 10 | New 20 | New 200 |
|---|---|---|---|---|---|---|
| 1 | | | | 0 | 0 | 0.02 |
| 2 | | | 2 | 0 | 0 | 0.05 |
| 3 | | | 346 | 0 | 0 | 0.06 |
| 4 | | 1 | — | 0 | 0 | 0.07 |
| 5 | | 21 | — | 0 | 0 | 0.10 |
| 6 | 5 | 406 | — | 0 | 0.01 | 0.11 |
| 7 | 42 | — | — | 0.01 | 0.01 | 0.13 |
| 8 | 437 | — | — | 0 | 0.01 | 0.16 |
| . | | | | | | |
| . | | | | | | |
| 16 | — | — | — | 0.01 | 0.02 | 0.30 |

What is claimed is:

1. A computer-implemented method for evaluation of XPath expressions for reducing time complexity to polynomial time over XML documents for web pages, where said method applied to an input XPath expression, called input query, comprises:
  (a) using one or more data structures for generating and storing results of evaluations of subexpressions of said input query with respect to a plurality of contexts, whereby multiple evaluations of a subexpression with respect to a same context are avoided, and
  (b) generating a result of said evaluation of said input query by building and combining evaluations of said subexpressions, according to an order induced by a hierarchical structure of said input query;
  whereby XPath expressions are evaluated in polynomial time in the sum of the size of said XPath expression and the size of an underlying XML document for web over pages which said XPath expression for reduced time complexity to polynomial time are evaluated.

2. The method of claim 1, where said input query is variable-free and is formulated in an XML query language known as XPath 1.0 whereby variable-free XPath expressions formulated in said query language can be evaluated in time polynomial in the sum of the size of an XPath expression to be evaluated and the size of an underlying XML document over which said query is to be evaluated.

3. The method of claim 1, where said input query is embedded in a program and is to be executed during a run of said program relative to a context determined by said program, said context determining at least:
  (a) a context node referring to an element of an XML document where said XML document constitutes an input document over which said input query is to be evaluated,
  (b) a context position given by an integer,
  (c) a context size given by an integer,
  (d) a set of variable bindings.

4. The method of claim 3, where said program is written in a language from a group comprising XSL, XSLT, XSL-FO, and XQUERY.

5. The method of claim 1, where said input query is a stand alone variable-free XPath query.

6. The method of claim 1, where said input query is variable-free and arises from an execution of a query embedded in a program where said input query is obtained from said embedded query by replacing all variables of said input query with constants according to a variable-binding of a context provided by said program.

7. The method of claim 1 comprising
(a) receiving an XML document, called input XML document, whose elements according to a document object model are here referred to as XML-nodes;
(b) receiving said input query to be evaluated over said XML document;
(c) parsing said input query and producing from said input query a hierarchical data structure, called query-tree, containing a plurality of nodes, called query-tree-nodes;
(d) constructing for each of said query-tree-nodes in said query-tree, a data structure, called a context-value table, said context-value table containing zero or more entries, where said context-value tables are constructed in some order induced by a hierarchical structure of said query-tree; and
(e) finding a result of said query evaluation in one or more entries of said context-value tables.

8. The method of claim 7, where said input query is embedded in a program and is evaluated with respect to a context provided by said program where said context contains a variable-binding assigning constants to variables occurring in said input query and where said variables are replaced by constants according to said variable-binding at a processing phase selected from a group of processing phases comprising:
(a) a phase before converting said input query into said query-tree,
(b) a phase between the conversion of said input query into said query-tree and the construction of said context-value tables, and
(c) a phase consisting of the construction of said context-value tables.

9. The method of claim 7, where said query-tree is implemented according to one method of a group of implementation methods comprising:
(a) implementing and storing a query-tree as an explicit data structure or as part of such a structure, wherein query-tree-nodes are explicitly represented,
(b) implementing a query-tree as an implicit data structure or part of such by using one or more procedures that dynamically compute query-nodes on demand, and
(c) implementing a query-tree as a hybrid data structure.

10. The method of claim 7, where each of said context-value tables is implemented according to one method of a group of implementation methods comprising:
(a) implementing and storing a context-value-table as an explicit data structure or as part of such a structure, wherein the entries assigned to each query-tree-node are explicitly represented,
(b) implementing a context-value table as an implicit data structure or part of such by using one or more procedures that dynamically compute on demand the entries assigned to each query-tree-nodes as output, and
(c) implementing a context-value table as a hybrid data structure, where some of the entries assigned to query-tree-nodes or parts of said entries are explicitly represented while others or parts of others are dynamically computed as an output of one or more procedures.

11. The method of claim 7 comprising in addition the step of parsing said XML document and representing the XML document as a hierarchical tree-shaped data structure, called XML-document-tree, said XML-document-tree consisting of a plurality of nodes, called XML-tree-nodes.

12. The method of claim 7, where said XML document is already available in form of a data structure.

13. The method of claim 7 where said query-tree-nodes represent subentities of a query, called tree-query, which is semantically equivalent to said input query, and where a hierarchical relationship among said query-tree-nodes in said query-tree reflects a hierarchical relationship among said subentities of said tree-query, and where said subentities are selected from a group comprising:
(a) said tree-query,
(b) proper subqueries of said tree-query,
(c) predicates occurring in said tree-query,
(d) atomic subexpressions of said tree-query,
(e) other subexpressions of said tree-query.

14. The method of claim 13, where a top query-tree-node of said query-tree represents said tree-query and where each subexpression of said tree-query is represented by a query-tree-node of said query-tree and where immediate sub expressions of a subexpression represented by a query-tree-node are represented by query-tree-nodes which are hierarchically immediately subordinate to said query-tree node in said hierarchical data structure constituting said query-tree.

15. The method of claim 14, where said hierarchical relationship among said query-tree-nodes of said query-tree corresponds to a parse tree of said tree-query.

16. The method of claim 14, where said input query is equal to said tree-query and where said query-tree structurally corresponds to a parse tree of said input query.

17. The method of claim 14, where said tree-query is obtained from said input query after some pre-processing.

18. The method of claim 17, where said pre-processing contains at least one step selected from a group of steps containing:
(a) transforming said input query into an equivalent query in unabbreviated XPath syntax;
(b) replacing a numeric expression occurring within a predicate subexpression of said input query, said numeric expression not being an operand of an operation or a comparison predicate, with an equation equating said numeric expression with a position atom referring to a position of a context in which said predicate is to be evaluated;
(c) replacing implicit type conversions with explicit type conversions using appropriate type conversion functions provided by XPath; and
(d) replacing variables occurring in said input query with values provided by an input variable binding.

19. The method of claim 18, where, in said pre-processing, the steps in said group of steps are applied repeatedly in some order until none of said steps is further applicable, thereby transforming said input query into a normalized query where said normalized query adheres or corresponds to unabbreviated XPath syntax, contains no numeric expressions not being an operand of some operation or comparison predicate, contains no implicit type conversions, and contains no variables.

20. The method of claim 17, where said pre-processing is done at a syntactic level and yields as result an XPath query which is further transformed into said tree-query.

21. The method of claim 17, where said pre-processing is done at a data representation level and yields as result a data structure representing an XPath query.

22. The method of claim 13, where each query-tree-node of said query-tree is associated with an operation, said operation corresponding to a top level operator or predicate of said subentity of said tree-query represented by said query-tree-node and where said operation belongs to a group of operations comprising:
 (a) node-set-type operations whose results range over node sets of the XML-nodes of said XML-document,
 (b) number-type operations whose results are numeric,
 (c) string-type operations, whose results are strings, and
 (d) Boolean-type operations, whose results are of Boolean value.

23. The method of claim 22 where for each query-tree-node representing a compound subentity of said tree-query, a context-value table associated with said query-tree-node is built from context-value tables associated with nodes representing subentities of said tree-query at a next lower hierarchical level and which are contained in said compound subentity, by using a procedure corresponding to said operation associated with said query-tree-node.

24. The method of claim 23 where said entries of each context-value table contain pairs consisting of contexts and values, where a value is of a type contained in a group of types comprising nodeset, numeric, string, and Boolean, where a value of type nodeset represents an ordered set of XML-nodes from said input XML document.

25. The method of claim 24, where each of said contexts contains a context node and zero or more further elements from a list of possible context elements comprising a context size, a context position, a set of variable-bindings.

26. The method of claim 24, where said procedure computes said context-value table associated with said query-tree-node from context-value tables associated with nodes representing subentities of said tree-query node according to the following principles:
 (a) said context-value table associated with said query-tree-node is obtained as a set of entries, each consisting of a pair of a context and a value;
 (b) for each context, said context-value table contains at most one entry containing said context;
 (c) each of said entries comprises a pair of a context and a value and is obtained by an appropriate computation on input consisting of said context and said context-value tables of said subentities of said query-tree-node, said computation matching an XPath semantics of said operation corresponding to said query-tree-node.

27. The method of claim 26, where, in one possible embodiment, said procedure computes said context-value table associated with said query-tree-node according to some principles, including:
 (a) if said operation corresponds to a node set union, denoted by "|" in XPath, then said context-value table associated with said query-tree-node is obtained as a set of entries, where each said entry is a pair of a context and an XML-nodeset value such that a value for one context consists of a union of the XML-nodeset values associated, through pairing, to said context in said context-value tables associated with the nodes representing subentities of said tree-query node;
 (b) if said operation corresponds to a simple location step consisting of an axis relation and a node test, then said context-value table associated with said query-tree-node is obtained as a set of entries, where each said entry is a pair of a context and an XML-nodeset value such that the value for one context consists of the set of XML-nodes that are reachable from the context node via the axis relation of said simple location step and match the node test of said simple location step;
 (c) if said operation corresponds to a restriction of a location step by an XPath predicate in said input query, then said context-value table associated with said query-tree-node is obtained as a set of entries, where each entry of said set of entries is a pair of a context, called reference context, and an XML-nodeset value, said value consisting of the set of XML-nodes such that each element XML-node of said set occurs in a context component of an entry of the context-value table associated with the query-tree-node representing the immediate predicate subexpression of said XPath predicate, where the value component of said entry is the boolean value "true" and where said context component further contains a position and a size such that:
  said position identifies the position of said element XML-node among the nodes in the value-component of a specific entry of the context-value table associated to the direct location-path subexpression of said restriction of said location step, said specific entry having as context-component said reference query-tree-node and where said position is determined with respect to document order in case said location step has a forward axis as principal axis and in reverse document order in case of said location step has a backward axis as principal axis, and
  said size matches the size of the value-component of said specific entry;
 (d) if said operation corresponds to a composition of location paths, then said context-value table associated with said query-tree-node is obtained as a set of entries, where each said entry, called start entry, is a pair of a context and a XML-nodeset value, where said context consists of a context node from a start context of said context-value table associated with the left direct subexpression and an arbitrary but reasonably restricted context position and size, and said XML-nodeset value is the union of the nodeset values in entries of the context-value table associated with the right direct subexpression for which the context-node appears in the XML-nodeset value of the start entry;
 (e) if said operation is an XPath position( ) statement, then said context-value table associated with said query-tree-node is obtained as a set of entries, where each said entry is a pair of a valid context and its context position as value;
 (f) if said operation is an XPath last( ) statement, then said context-value table associated with said query-tree-node is obtained as a set of entries, where each said entry is a pair of a valid context and its context size as value;
 (g) if said operation corresponds to a "root" location step, then said context-value table associated with said query-tree-node is obtained as a set of entries, where each said entry is a pair of a valid context and an XML-nodeset, where said nodeset appears in an entry of the context-value table associated with the direct location-step subexpression and that entry has the document root node as context-node;
 (h) if said operation is an XPath "count" statement, then said context-value table associated with said query-tree-node is obtained as a set of entries, where each said entry is a pair of a valid context, called result context, and an number value, such that in the context-value table associated with the query-tree-node representing the immediate subexpression of said count statement, there is an entry whose context equals said result context and whose value-component is an XML-nodeset having said number value as cardinality;

(i) if said operation is an XPath number constant statement, with a given number, then said context-value table associated with said query-tree-node is obtained as a set of entries, where each said entry is a pair of a valid context and said number as value;

(j) if said operation is an XPath arithmetic addition statement, with a given number, then said context-value table associated with said query-tree-node is obtained as a set of entries, where each said entry is a pair of a valid context and a number value such that there is an entry in the context-value table associated with the left direct subexpression of said addition statement and an entry in the context-value table associated with the right direct subexpression of said addition statement that both have said context and for which the sum of their number values equals said number;

(k) if said operation is an XPath less-than comparison statement, with a given number, then said context-value table associated with said query-tree-node is obtained as a set of entries, where each said entry is a pair of a valid context and a boolean value such that there is an entry in the context-value table associated with the left direct subexpression and an entry in the context-value table associated with the right direct subexpression that both have said context and for which the left number value is smaller than the right number value if and only if said boolean value is true;

(l) if said operation is another statement, then said context-value table associated with said query-tree-node is obtained as a set of entries, where each said entry is a pair of a valid context and a value which is computed according to an XPath standard semantics of said statement.

28. The method of claim 24, where each context-value table contains all possible entries that can be constructed according to said method.

29. The method of claim 24, where each context-value table contains at least all possible entries contributing to constructing some result of said input query, whereby a complete answer to said input query can still be obtained while irrelevant entries in context tables can be omitted.

30. The method of claim 29, where said entries are restricted by a top-down pre-processing of said query-tree preceeding the bottom-up construction of said context-value tables, determining for each query-tree-node a set of potential entries containing all relevant possible entries.

31. The method of claim 24, where, after having accomplished the construction of said context-value tables, a result of said evaluation of said input query is determined by a plurality of values, where said values are all of a type selected from a group of types comprising: XML-nodesets, numbers, strings, and Boolean values; and where said values are contained in the context-value table associated with the hierarchically highest query-tree-node of said query-tree.

32. The method of claim 7, where for each said query-tree-node, said context-value table contains a result of an evaluation of a part or the totality of said input query with respect to zero or more contexts, where a context is selected from a group containing:

(a) a simple context consisting of an XML-node of said XML document, and (b) a complex context consisting of a combination of an XML-node of said XML document, a position, and a size, where said position is an integer intended for expressing a position of said XML-node in an ordered set of XML-nodes, and said size is an integer intended to express a cardinality of a set of XML-nodes, whereby, said input query can be efficiently evaluated by avoiding multiple evaluation of a part of said input query for a same context.

33. The method of claim 13, where for each query-tree-node of said query-tree, said context-value table for said query-tree-node contains a result of an evaluation of a tree-query subentity represented by said query-tree-node with respect to zero or more contexts, where a context is selected from a group containing:

(a) a simple context, consisting of an XML-node of said XML document, and (b) a complex context consisting of a combination of an XML-node of said XML document, a position, and a size, where said position is an integer intended for expressing the position of said XML-node in an ordered set of XML-nodes, and said size is an integer intended to express a cardinality of a set of XML-nodes, whereby, said tree query and, equivalently, said input query can be efficiently evaluated by avoiding a multiple evaluation of a part of said tree-query for a same context.

34. The method of claim 7, where said order induced by said structure of said query-tree is an order processing a node of said query-tree before processing a hierarchically higher node in said query-tree, thereby generating a bottom-up traversal of said query-tree.

35. The method of claim 33, where said order induced by said structure of said query-tree is an order processing a node representing a subentity of said tree-query only after having processed all nodes representing all subentities contained in the former subentity, thereby generating a bottom-up traversal of said query-tree.

36. The method of claim 35, where for each query-tree-node representing a compound subentity of said tree-query, a context-value table associated to said query-tree-node is built from context-value tables associated with the nodes representing subentities of said tree-query at a next lower hierarchical level and which are contained in said compound subentity.

37. The method of claim 35, where each query-tree-node of said query-tree is associated with a top level operation of a subentity of said tree-query, and where entries of each context-value table of said query-tree-node contain pairs consisting of contexts and values, where said values belong to a group including XML-nodesets, numbers, character strings, and Boolean values.

38. A method as in claim 7, wherein said order induced by said hierarchical structure of said query-tree for constructing said context-value tables is an order processing a node of said parse tree before processing a child node of said node in said parse tree, thereby generating a top-down traversal of said parse tree.

39. The method of claim 1, where said data structures maintain information on contexts.

40. The method of claim 1, where said input query is first transformed into a hierarchical data structure, called query-tree, said query-tree representing a hierarchical XML-query, called tree-query, equivalent to said input query, and where said query-tree contains hierarchically organized elements called query-tree-nodes corresponding to subexpressions of said tree-query, and where each of said query-tree nodes is associated with an operation corresponding to a top level operation of said subexpression corresponding to said query-tree node, and where said query-tree is selected from a group of possible data structures comprising:

(a) a parse tree of said input query whose nodes correspond to subexpressions of said input query, and (b) a data structure obtained from a parse tree of said input query by equivalence-preserving transformations, and (c) a data structure which expresses a query equivalent to a query obtained from said input query after replacing all variables of said input query with constants according to a variable-binding of a context provided by a program in which said input query is embedded.

41. The method of claim 40, where an order of computational steps effected during an evaluation of said input query on said XML document is primarily determined by said query-tree, in that an overall evaluation is effected by applying said operations associated with said query-tree-nodes in an order corresponding to a hierarchical organization of said query-tree-nodes within said query-tree. In particular, each of said operations is applied at once to all context and value data relevant at a current point of a computation, such that when such a step corresponding to an operation has been finished, said operation does not have to be reconsidered.

42. The method of claim 41, where said evaluation proceeds by processing said query-tree according to a strategy selected from a group of evaluation strategies containing:

(a) top-down evaluation, and (b) bottom-up evaluation, and (c) hybrid evaluation, and d) inside-out evaluation.

43. The method of claim 41, where said operations correspond to XPath operators of said input query selected from a group of operators comprising: disjunction, simple location step without predicate, restriction of a location step by an XPath predicate, composition of location paths, XPath position( ) statement, XPath last( ) statement, root location step, XPath count statement, XPath number constant statement, arithmetic operator, comparison operator, Boolean conjunction, and other operational XPath element.

44. The method of claim 41, where an input of said evaluation is an XML document, whose elements according to a document object model are here referred to as XML-nodes, and where said evaluation proceeds by processing said query-tree-nodes according to a recursive top-down evaluation strategy, where said evaluation starts at a hierarchically most general node, called root, of said query-tree, said root representing the entire tree-query, and where said evaluation associates one or more sets of contexts, called context-sets, to each of said query-tree-nodes, and where in case said input query is generated during an evaluation of a program providing a context with respect to which said input query is to be evaluated, then said root is associated with a unique context set containing as unique element said context provided by said program.

45. The method of claim 44, where for each of said query-tree-nodes said evaluation constructs one or more ordered sets of XML-nodes of said XML document, called result-sets, each consisting of results of evaluations of a subexpression of said tree-query corresponding to said query-tree-node over said XML document with respect to some context-set associated with said query-tree-node, where, for a given context-set, a corresponding result-set consists of the union of results of evaluations of said subexpression over said XML document with respect to each single context contained in said given context-set.

46. The method of claim 45, where said result-sets are maintained as data structures selected from the group containing:

(a) explicit data structures; and (b) implicit data structures constructed dynamically during an execution of recursive procedures.

47. The method of claim 45, where for each result set among said result-sets an order of its elements is defined and maintained according to a policy from a group of policies including:

(a) explicit ordering, where said order is explicitly reflected in a data structure representing said result-set and where said order, for a result-set of each query-tree-node, depending on an operation associated with said query-tree-node is induced by an ordering in a group of orderings consisting of document order and reverse document order; and (b) implicit ordering, where said result-set is not explicitly represented in a data structure representing said result-set, and where said order is generated when needed via one or more procedures accessing said data structure and where said order, depends on an operation associated with the query-tree-node with which said result set is associated , and where said order corresponds to an ordering in a group of orderings containing document order and reverse document order.

48. The method of claim 45, where for each query-tree node having immediate subordinate query-tree-nodes in said query-tree, called children of said query-tree-node, said result-sets associated with said query-tree node are computed by a method involving computations including:

(a) determining one or more context-sets for children of said query-tree-node, such that none of said context-sets contains duplicate contexts;

(b) computing one or more result-sets for children of said query-tree-node, such that for a child among said children, a context set previously computed for said child gives rise to one corresponding result-set for said child, where said result set is obtained as a union of results of evaluations of said subexpression corresponding to said query-tree-node for each context in said context-set, and where multiple evaluations of said subexpression for a same context are avoided by storing and re-using evaluation results of said subexpression for single contexts.

(c) computing said result-sets for said query-tree-node from result-sets of its children, where said computing of said result-sets depends on an operation associated with said query-tree-node.

49. The method of claim 48, where for a query-tree-node, called leaf, having no subordinate query-tree-node in said query-tree, result-sets associated with said query-tree-node are computed directly by evaluating said subexpression of said tree-query associated with said leaf over said XML-document for said context-sets.

50. The method of claim 48, where said root admits a single result-set and where said evaluation of said input query results in said single result-set.

51. The method of claim 48, where said method for computing said result-sets is implemented by means of a recursive procedure, making a recursive procedure call, whenever, during a computation of result-sets of a query-tree-node, results-sets of a child of said node is required.

52. The method of claim 40, where one input of said evaluation is an XML document, whose elements are called XML-nodes, and where if said input query belongs to an XPath fragment called "Core XPath", said fragment consisting of XPath-queries excluding the use of any arithmetical operators and of any string operators, then said query-tree closely corresponds to a parse tree of said input query, and said operations associated with said query-tree-nodes are selected from a group comprising union of nodesets, intersection of nodesets, nodeset difference, axes, node-tests, a nodeset constant denoting the nodeset consisting only of the root of said XML document, and a nodeset constant "dom" denoting the set of all XML-nodes in said XML-document.

53. The method of claim 52, where said tree-query is evaluated on a random-access machine by an evaluation mechanism using methods that evaluate each of said operations associated with said query-tree-nodes in a number of steps linear in the size of said XML document, whereby said input query can be evaluated on a random access machine in a number of steps linear in the product of the size of said XML document and the size of said input query.

54. The method of claim 52, where said input query belongs to an XPath fragment called "XPatterns", said fragment extending "Core XPath" by
  (a) the XPath function "id";
  (b) equality statements where one operand is a string constant; and
  (c) the XSLT Pattern functions "first-of-any", "last-of-any", "first-of-type", and "last-of-type"
and where said query-tree closely corresponds to a parse tree of said input query, and said operations associated with said query-tree-nodes are selected from a group comprising union of nodesets, intersection of nodesets, nodeset difference, axes, node-tests, a nodeset constant denoting the nodeset consisting only of the root of said XML document, nodeset constant "dom" denoting the set of all XML-nodes in said XML-document, the function "id", the function "first-of-any", the function "last-of-any", the function "first-of-type", the function "last-of-type", and a function determining all nodes whose string value coincides with a given string constant.

55. The method of claim 54, where said tree-query is evaluated on a random-access machine by an evaluation mechanism using methods that evaluate each of said operations associated with said query-tree-nodes in a number of steps linear in the size of said XML document, whereby said input query can be evaluated on a random access machine in a number of steps linear in the product of the size of said XML document and the size of said input query.

56. A computer-implemented method for evaluation of an XPath expression for reducing time complexity to polynomial time, called input query, on an XML document for web pages, called input document, with respect to a given context, called input context, said method comprising:
  (a) using of one or more data structures, jointly called data pool, for memorizing and retrieving results of evaluations of subexpressions of said input query with respect to a plurality of contexts;
  (b) one or more subordinate methods, jointly called basic-creating, for evaluation of a basic set of XPath expressions, called basic fragment, said basic fragment including atomic XPath expressions, whereby XPath expressions belonging to said basic fragment are generated directly over said input document, without recurring to evaluations of subexpressions;
  (c) one or more subordinate methods, jointly called compound-evaluation, for generating a compound XPath expression with respect to a given context, such that said compound-evaluation generates a result of said compound XPath expression over said input-document with respect to said context by suitably obtaining and combining results of evaluations of subexpressions of said compound XPath expression with respect to a plurality of contexts, where subexpressions belonging to said basic fragment are evaluated by said basic-evaluation, and where compound subexpressions are in turn evaluated by said compound-evaluation, and where multiple evaluations of a same subexpression with respect to a same context are avoided by storing said results of evaluations of subexpressions in said data pool and by retrieving stored results from said data pool when needed;
  (d) answering said input query with respect to said context over said input document by applying said basic-evaluation to said input query in case said input query belongs to said basic fragment, arid by applying said compound-evaluation to said input query in case said input query is a compound XPath expression;
whereby XPath expressions are efficiently generated of web pages for reducing time complexity to polynomial time over XML documents.

57. The method of claim 56, where said input query adheres to the syntax of an XML query language known as XPath 1.0, whereby all queries of said query languages can be evaluated with respect to a given context with polynomial worst-case time complexity over input XML documents.

58. The method of claim 56 comprising in addition at least one suitable step selected from a group of steps comprising:
  (a) parsing said input query and making available said input query and its subexpressions in form of one or more suitable data structures;
  (b) replacing variables occurring in said input query by constants according to a variable-binding provided as part of said input context;
  (c) retrieving said input document from secondary storage;
  (d) parsing and making available said input document and elements of said input document in form of one or more suitable data structures.

59. The method of claim 56, where said data pool stores a plurality of triples, where at a given step of said evaluation, each of said triples contains at least three components:
  (a) a component, called subexpression-component, identifying a subexpression of said input query, and
  (b) a component, called context-component, identifying a context with respect to which said subexpression stored in said subexpression-component was previously evaluated, and
  (c) a component, called value-component, storing the result of the evaluation of said subexpression stored in said subexpression-component with respect to said context stored in said context-component.

60. The method of claim 56, where said input context determines at least:
  (a) a context node referring to an element of an XML document where said XML document constitutes the input document over which said input query is to be evaluated, and
  (b) a context position given by an integer, and
  (c) a context size given by an integer, and
  (d) a set of variable bindings.

61. The method of claim 56, where a context from said plurality of contexts with respect to which a subexpression of said compound XPath expression is to be evaluated contains at least: a context node referring to an XML-element of said input document and, if needed, a context position given by an integer, and, if needed, a context size given by an integer.

62. The method of claim 56, where said compound-evaluation determines the result of said compound XPath expression from the top-level operation of said compound XPath expression and from results of subexpressions represented by children of a node representing said compound XPath expression in a suitable parse tree of said input query.

63. The method of claim 62, where the order of processing subexpressions induced by said compound-evaluation is selected from a group comprising:
   (a) depth-first order, and
   (b) breadth-first order.

64. The method of claim 56, where said method of evaluation of said input query is obtained by improving an existing evaluation method for XPath queries.

65. The method of claim 56, where said improving is achieved through a plurality of modifications comprising:
   (a) adding said data pool to data structures already used by said existing evaluation method;
   (b) adding a storage procedure and activating said procedure after each evaluation of an XPath subexpression with respect to a context, said storage procedure storing in said data pool information identifying said XPath subexpression, said context, and the result of said evaluation of said XPath subexpression with respect to said context;
   (c) adding a retrieval procedure which is activated when a proper XPath subexpression of said input query has to be evaluated with respect to a current context, said retrieval procedure comprising the steps of accessing said data pool and checking whether said proper XPath subexpression has already been evaluated with respect to said current context during previous steps of said evaluation of said input query; if so, retrieving from said data pool the result of the evaluation of said proper XPath subexpression with respect to said current context and returning said result by making it available to subsequent steps of said evaluation of said input query;
   (d) modifying said evaluation method having as effect that a repeated evaluation of a proper XPath subexpression of said input query with respect to a same context is replaced by providing a correct result through said retrieval procedure, whereby multiple evaluations of a same XPath subexpression under a same context are avoided.

66. The method of claim 64, where said existing evaluation method for XPath queries is a method used by Microsoft Internet Explorer 6.

67. The method of claim 64, where said existing evaluation method for XPath queries is a method used by Microsoft MSXML.

68. The method of claim 64, where said existing evaluation method for XPath queries is a method used by a version of Saxon.

69. The method of claim 64, where said existing evaluation method for XPath queries is a method used by a version of Xalan-Java.

70. The method of claim 64, where said existing evaluation method for XPath queries is a method used by a version of Xalan-C++.

71. The method of claim 64, where said existing evaluation method for XPath queries is a method used by a version of XT.

72. The method of claim 64, where said existing evaluation method for XPath queries is a method used by a version of Oracle XDK.

73. The method of claim 64, where said existing evaluation method for XPath queries is a method used by a version of Sun XSLTC.

74. The method of claim 64, where said existing evaluation method for XPath queries is a method used by a version of jd.xslt.

75. A system for evaluation of an XPath expression, called input query, on an XML document, called input document, with respect to a given context, called input context, said system comprising:
   (a) a data storage device and means for storing and manipulating one or more data structures, jointly called data pool, for memorizing and retrieving results of evaluations of subexpressions of said input query with respect to a plurality of contexts;
   (b) means, called basic-evaluation-means, for evaluation of a basic set of XPath expressions, called basic fragment, including atomic XPath expressions, whereby XPath expressions belonging to said basic fragment are evaluated directly over said input document, without recurring to evaluations of subexpressions;
   (c) means, called compound-evaluation-means, for evaluating a compound XPath expression with respect to a given context, such that said compound-evaluation-means compute a result of said compound XPath expression over said input-document with respect to said context by suitably obtaining and combining results of evaluations of subexpressions of said compound XPath expression with respect to a plurality of contexts, where subexpressions belonging to said basic fragment are evaluated by said basic-evaluation, and where compound subexpressions are in turn evaluated by said compound-evaluation-means, and where multiple evaluations of a same subexpression with respect to a same context are avoided by storing said results in said data pool and by retrieving stored results from said data pool when needed;
   (d) answering said input query with respect to said context over said input document by applying said basic-evaluation-means to said input query in case said input query belongs to said basic fragment, and by applying said compound-evaluation-means to said input query in case said input query is a compound XPath expression;
   whereby XPath expressions can be efficiently evaluated over XML documents.

76. A computer-implemented system for evaluation of XPath expressions for reducing time complexity to polynomial time, said XPath expressions being also known as XML Path expressions, over XML documents, said system comprising:
   (a) a data storage device and one or more data structures, said data structures being used for computing and storing results of evaluations of subexpressions of an input XPath expression, called input query, with respect to a plurality of contexts, whereby multiple evaluations of a subexpression with respect to a same context are avoided, and
   (b) means for computation of a result of said evaluation of said input query by building and combining evaluations of said subexpressions, where an order of said building and combining is obtained from a hierarchical structure of said input query;

whereby XPath expressions are evaluated in polynomial time in the sum of the size of said XPath expression and the size of an underlying XML document over which said XPath expression are evaluated for reducing time complexity to polynomial time.

77. The system of claim 76 comprising
(a) means for receiving an XML document, called input XML document; and
(b) means for receiving said input query to be evaluated over said XML document; and
(c) a processor and means for parsing said input query and producing from it a hierarchical data structure, called query-tree, containing a plurality of nodes, called query-tree-nodes; and
(d) a processor and means for constructing for each of said query-tree-nodes in said query-tree, a data structure, called a context-value table, said context-value table containing zero or more entries, where said context-value tables are constructed in some order induced by a hierarchical structure of the query-tree; and
(e) means for finding a result of said query evaluation in one or more entries of said context-value tables;
whereby said result can be obtained in polynomial time in the sum of the size of said input XML-document and of said input query.

* * * * *